United States Patent
Okada

(10) Patent No.: US 10,807,612 B2
(45) Date of Patent: Oct. 20, 2020

(54) STEERING WHEEL

(71) Applicant: TOYODA GOSEI CO., LTD., Kiyosu-shi, Aichi-ken (JP)

(72) Inventor: Izuru Okada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/509,738

(22) Filed: Jul. 12, 2019

(65) Prior Publication Data

US 2020/0039536 A1    Feb. 6, 2020

(30) Foreign Application Priority Data

Aug. 3, 2018 (JP) .................................. 2018-146720
Mar. 28, 2019 (JP) .................................. 2019-063645

(51) Int. Cl.
| | |
|---|---|
| *B62D 1/06* | (2006.01) |
| *B60W 50/16* | (2020.01) |
| *B62D 1/08* | (2006.01) |
| *B60Q 9/00* | (2006.01) |

(52) U.S. Cl.
CPC ............. *B60W 50/16* (2013.01); *B60Q 9/00* (2013.01); *B62D 1/06* (2013.01); *B62D 1/08* (2013.01)

(58) Field of Classification Search
CPC . B62D 1/04; B62D 1/046; B62D 1/06; B62D 1/08; B62D 1/10; B60W 50/16; G05G 5/03
See application file for complete search history.

(56) References Cited

U.S. PATENT DOCUMENTS

| | | | |
|---|---|---|---|
| 2009/0079551 A1* | 3/2009 | Lemasson | B62D 1/046 340/425.5 |
| 2016/0023667 A1* | 1/2016 | Sakurai | B62D 1/04 74/552 |
| 2016/0023677 A1 | 1/2016 | Sakurai et al. | |
| 2016/0114826 A1* | 4/2016 | Moinard | B62D 1/046 74/552 |
| 2017/0021854 A1 | 1/2017 | Mitobe et al. | |
| 2017/0341683 A1* | 11/2017 | Haba | B62D 1/046 |

FOREIGN PATENT DOCUMENTS

| | | |
|---|---|---|
| JP | 2016-30471 A | 3/2016 |
| JP | 2017-7594 A | 1/2017 |

* cited by examiner

*Primary Examiner* — Richard W Ridley
*Assistant Examiner* — Brian J McGovern
(74) *Attorney, Agent, or Firm* — Posz Law Group, PLC

(57) ABSTRACT

A steering wheel includes: a ring part; a boss part; a spoke part; and a core material. A vibration device is configured to be attached to an attachment seat provided in the core material. The vibration device includes: a vibration motor; and an attachment bracket which is clamped by a screw in the attachment seat. The attachment bracket includes: an attachment piece; and a holding piece which holds the vibration motor. The attachment seat and the attachment bracket correspond to each other so as to arrange a rotation regulating unit, configured to regulate a rotation of the attachment piece during screw-clamping in the attachment seat, and a floating regulating unit, configured to regulate floating of the attachment piece from the attachment seat due to declining of the holding piece holding the vibration motor when the attachment piece is arranged in the attachment seat directed upward.

12 Claims, 17 Drawing Sheets

STEERING WHEEL

CROSS-REFERENCE TO RELATED APPLICATION(S)

This application is based upon and claims the benefit of priority from Japanese Patent Application No. 2018-146720, filed on Aug. 3, 2018, and Japanese Patent Application No. 2019-063645, filed on Mar. 28, 2019, the entire contents of which are incorporated herein by reference.

BACKGROUND

1. Field of the Invention

The present invention relates to a steering wheel which is arranged with a vibration device with which a driver gripping a ring part during an operation can sense a vibration.

2. Description of the Related Art

In the related art, a steering wheel is known in which when a traveling vehicle is deviated from a traveling lane, a vibration motor of a vibration device is operated to generate vibration in a ring part so as to notify danger to a driver gripping the ring part during steering (for example, see JP-A-2017-7594).

In the steering wheel, the vibration device is configured to be arranged in the ring part such that the vibration motor of the vibration device is held by an attachment bracket, and the attachment bracket is attached by one screw to an attachment seat of a core material of the ring part. The vibration device is configured to reduce the number of components to be attached.

However, in the conventional steering wheel, when the screw is fastened to the attachment seat in the core material of the ring part, one screw is used. Therefore, the attachment bracket may be rotated, whereby the attachment bracket is hardly fixed at a predetermined position.

SUMMARY

The invention has been made to solve the above problem. An object of the invention is to provide a steering wheel in which an attachment operation is performed easily although an attachment bracket of a vibration device is attached by one screw to an attachment seat of a core material.

According to an aspect of the invention, there is provided a steering wheel including: a ring part configured to be gripped during steering; a boss part arranged in a center of the ring part; a spoke part connecting the ring part and the boss part; and a core material arranged to connect the ring part, the boss part, and the spoke part, wherein: a vibration device is configured to be attached to an attachment seat provided in the core material, so as to generate a vibration in the ring part; the vibration device includes a vibration motor in which a weight is provided in a rotary drive shaft of a motor body and an attachment bracket which holds the vibration motor and is clamped by a screw in the attachment seat of the core material; the attachment bracket includes: an attachment piece which is fixed in the attachment seat by one screw, has an insertion hole for inserting the screw, and is attached to the attachment seat by the screw which passes through the insertion hole to be fastened to an attachment hole of the core material; and a holding piece which extends to be bent from an end part of the attachment piece apart from the insertion hole and holds the vibration motor; and the attachment seat and the attachment bracket correspond to each other so as to arrange a rotation regulating unit and a floating regulating unit, the rotation regulating unit being configured to regulate a rotation of the attachment piece during screw-clamping in the attachment seat, the floating regulating unit being configured to regulate floating of the attachment piece from the attachment seat due to declining of the holding piece holding the vibration motor when the attachment piece is arranged in the attachment seat directed upward.

In the steering wheel according to the invention, when the insertion hole in the attachment piece of the attachment bracket of the vibration device is arranged in the attachment hole in the attachment seat of the core material, and the screw is fastened through the insertion hole to the attachment hole, the attachment seat and the attachment bracket correspond to each other such that the floating regulating unit and the rotation regulating unit are arranged. Further, the floating regulating unit regulates that the attachment piece floats from the attachment seat when the attachment piece is arranged in the attachment seat directed upward, that is, the attachment seat floats from the attachment hole in the insertion hole of the attachment piece. Thus, the screw for insertion in the attachment hole through the insertion hole is inserted easily. In addition, the rotation regulating unit regulates that the attachment piece is rotated during screw-clamping in the attachment seat. Thus, after the screw is inserted through the insertion hole into the attachment hole, the screw can be fastened to the attachment hole simply by rotating the screw and without firmly holding the attachment bracket additionally, and the fastening operation of the screw is performed efficiently, so that the attachment bracket is easily attached to the attachment seat.

Therefore, in the steering wheel according to the invention, even when the attachment bracket of the vibration device is configured to be attached to the attachment seat of the ring core material by one screw, the attachment operation is performed easily.

In the steering wheel according to the above, the rotation regulating unit may include an assembly concave part and an assembly convex part which are assembled to be fitted to each other when the attachment piece is arranged in the attachment seat and are arranged in correspondence with the attachment seat and the attachment piece.

With such a configuration, when the attachment piece of the attachment bracket is arranged in the attachment seat, the action of the rotation regulating unit can be exerted only by a simple assembly operation of simply fitting the corresponding assembly concave part and assembly convex part. Thus, the assembly operation is easily performed when the attachment piece of the attachment bracket is arranged in the attachment seat.

In the steering wheel according to the above, the assembly concave part and the assembly convex part of the rotation regulating unit may be compatible with the floating regulating unit to regulate that the attachment piece floats from the attachment seat.

With such a configuration, when the attachment piece of the attachment bracket is arranged in the attachment seat, the action of the rotation regulating unit and the floating regulating unit can be exerted only by a simple assembly operation of simply fitting the corresponding assembly concave part and assembly convex part. Thus, the assembly operation is more easily performed when the attachment piece of the attachment bracket is arranged in the attachment seat.

In the steering wheel according to the above, the assembly concave part may be provided in the attachment piece, and the assembly convex part may be provided in the attachment seat to penetrate the assembly concave part provided in the attachment piece, and the assembly convex part may include a protrusion part which locks a peripheral edge of the penetrated assembly concave part and regulates that the attachment piece floats from the attachment seat.

With such a configuration, when the attachment piece is arranged in the attachment seat, and the assembly convex part of the attachment seat penetrates through the assembly concave part of attachment piece, the protrusion part of the assembly convex part can lock the peripheral edge of the assembly concave part. Thus, when the attachment piece of the attachment bracket is arranged in the attachment seat, the assembly operation is performed easily by simply inserting the assembly convex part into the assembly concave part.

In the steering wheel according to the above, the assembly convex part may be provided in the attachment piece, and the assembly concave part may be provided in the attachment seat to insert the assembly convex part provided in the attachment piece, and the assembly concave part may include an abutting part which abuts on the assembly convex part when the attachment piece in the inserted assembly convex part is tilted in a floating direction and regulates that the attachment piece floats from the attachment seat.

With such a configuration, when the attachment piece is arranged in the attachment seat, and the assembly convex part of the attachment piece is inserted into the assembly concave part of the attachment seat, the abutting part of the assembly concave part can regulate the tilting of the assembly convex part. Thus, when the attachment piece of the attachment bracket is arranged in the attachment seat, the assembly operation is easily performed simply by inserting the assembly convex part into the assembly concave part.

In the steering wheel according to the above, the rotation regulating unit may be configured to arrange a regulation part, which regulates a side surface of the attachment piece during screw-clamping, on the attachment seat side.

With such a configuration, when the attachment piece is arranged in the attachment seat, the side surface of the attachment piece faces the regulation part on the attachment seat side, and the side surface of the attachment piece abuts on the regulation part on the attachment seat side during screw-clamping, so as to regulate the rotation of the attachment piece. Thus, the screw can be fastened smoothly.

In the steering wheel according to the above, the regulation part may be arranged to be provided with a core-material protrusion part which projects from the core material arranged in a periphery of the attachment seat.

With such a configuration, the regulation part is configured to be provided with the core-material protrusion part made of the core material. Thus, the strength can be improved, and the rotation of the attachment piece during screw-clamping can be regulated stably.

In a case where the regulation part is provided which regulates the rotation of the attachment piece, the regulation part may include a lock part which regulates a surface opposite to the attachment seat in the attachment piece and is arranged to form the floating regulating unit.

With such a configuration, an attachment operation is simplified such that when the attachment piece of the attachment bracket is arranged in the attachment seat, the attachment piece is locked by the lock part of the regulation part, and the side surface of the attachment piece is arranged to face the regulation part on the attachment seat side. With the simple attachment operation, the floating of the attachment piece and the rotation of the attachment piece during screw-clamping can be regulated, and the attachment operation at the time of arranging the attachment piece of the attachment bracket in the attachment seat is performed easily.

In the steering wheel according to the above, the floating regulating unit may extend beyond the holding piece in a direction away from the insertion hole of the attachment piece and may be configured to be arranged with a regulating piece which abuts on a vicinity of the attachment seat when the attachment piece is tilted in the floating direction.

With such a configuration, when the attachment piece is arranged in the attachment seat, the regulating piece abuts on the vicinity of the attachment seat. Thus, it is possible to regulate that the attachment seat floats from the attachment hole in the insertion hole of the attachment piece, and the screw can be simply inserted through the insertion hole into the attachment hole.

In the steering wheel according to the above, the core material made by metal may be exposed so that a peripheral edge of the attachment hole of the attachment seat abuts on the metal attachment piece of the attachment bracket, and portions of the rotation regulating unit and the floating regulating unit on the attachment seat side may be configured by arranging an elastic coating layer which coats the core material.

With such a configuration, when the attachment piece is clamped by the screw to be attached to the attachment seat, the attachment piece can be attached to the attachment seat by the metal touch between metal materials in the portion where the fastening force of the screw is applied, and the attachment piece can attached to the attachment seat by a strong fastening force. Further, the portion of the rotation regulating unit or the floating regulating unit on the attachment seat side is coated with the elastic coating layer. When the attachment piece is arranged in the attachment seat, by providing a slight gap in a range where the action of the rotation regulating unit or the floating regulating unit can be exerted, abnormal sound can be prevented even when a component of the rotation regulating unit or the floating regulating unit on the attachment seat side and a corresponding metal portion of the attachment bracket come into contact with each other during vehicle traveling. On the contrary, a portion of the rotation regulating unit or the floating regulating unit on the attachment seat side and the corresponding portion of the attachment bracket can be configured to have a marginal assembly dimension, so as not to interfere with each other strongly when the attachment piece is arranged in the attachment seat. Thus, the assembly operation of arranging the attachment piece in the attachment seat can be performed easily.

In the steering wheel according to the above, the attachment seat may be provided in a portion of the ring part in the core material or a portion of the spoke part in the core material.

In a case where the attachment seat is provided in the portion of the core material of the ring part, the vibration motor can be arranged in the ring part itself which the driver grips, and the driver easily senses the vibration of the vibration device during operation. However, in a case where the attachment seat is provided in the portion of the core material of the ring part, the vibration device has a bulky shape. Thus, the arrangement space is required, the thickness dimension of the vicinity of the ring part, particularly, the thickness dimension from a ring surface is increased, and the appearance of the vicinity of the ring part is easily deteriorated. When the attachment seat is provided in the portion of the core material of the ring part in consideration of this point, the attachment seat is arranged while a concave part is provided in the core material. However, in order to prevent that the strength of the core material of the ring part is reduced, it is necessary to provide the concave part for attachment seats, which requires much labor. On the other hand, in a case where the attachment seat is provided in the portion of the core material of the spoke part, the attachment seat can be arranged easily while the arrangement space is not taken into consideration, and the configuration in which the concave part causing the strength reduction is provided in the core material is not adopted.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
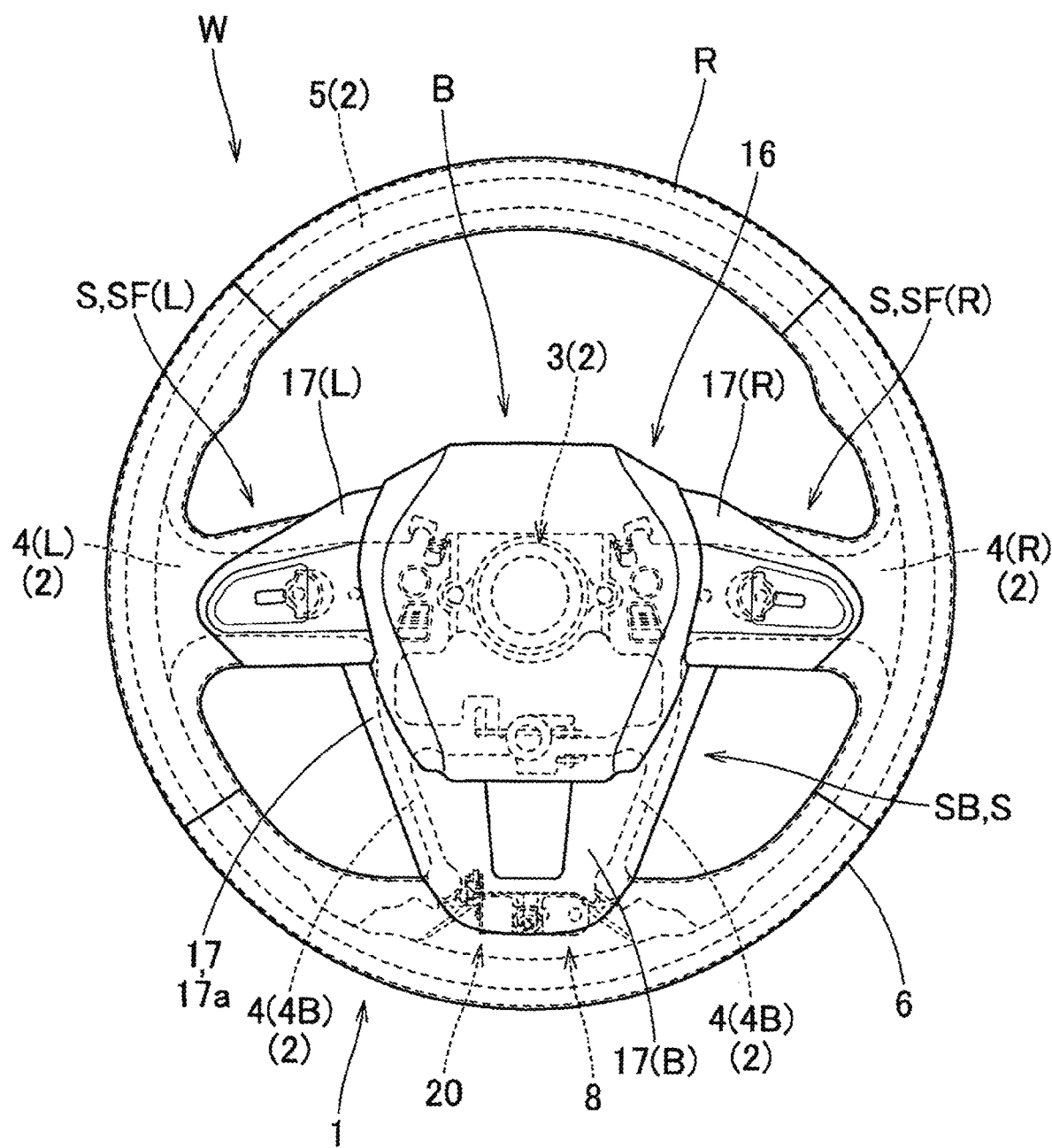
FIG. 1 is a schematic plan view of a steering wheel of a first embodiment according to the invention.
Figure 2:
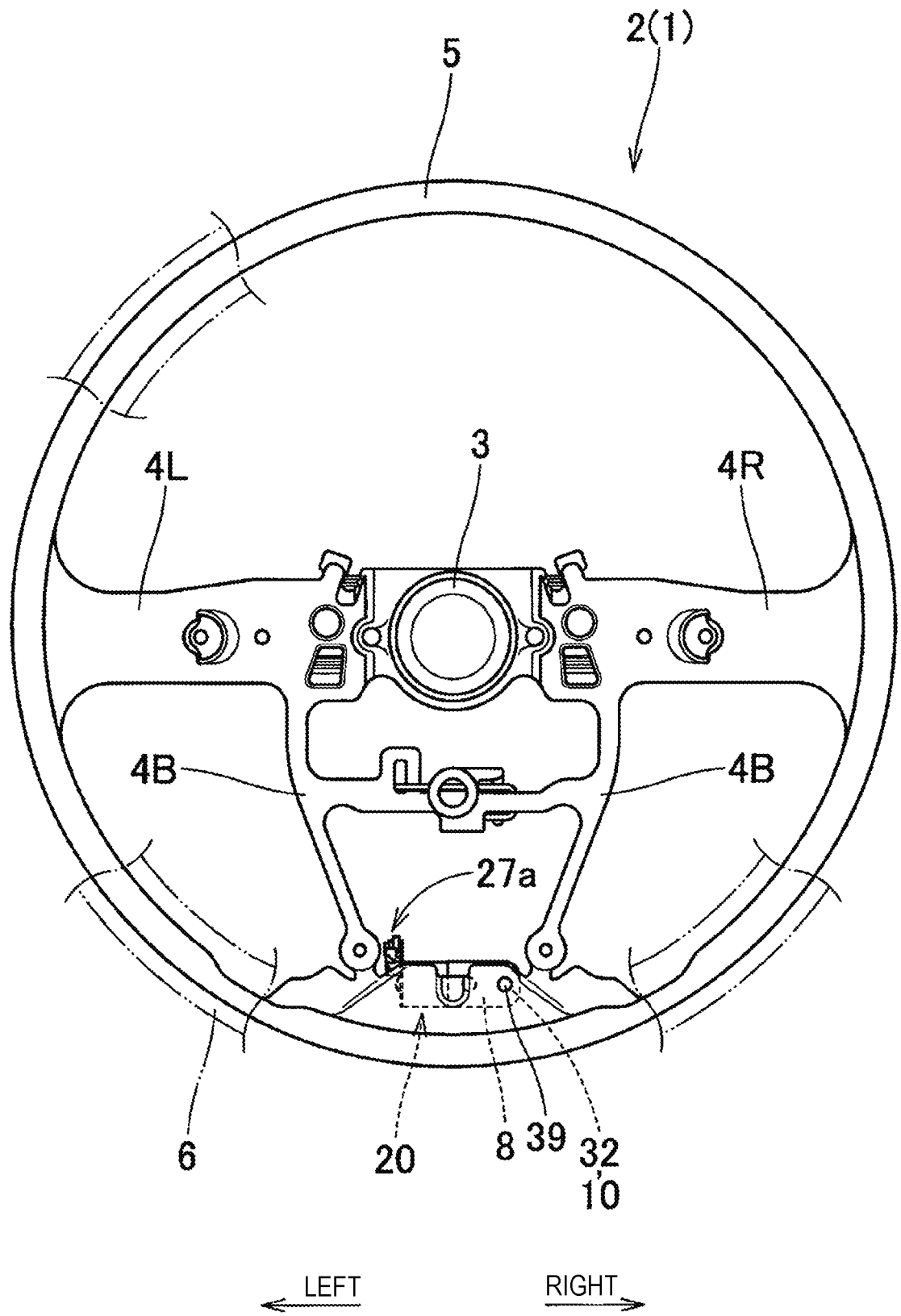
FIG. 2 is a schematic plan view illustrating a core material of the steering wheel of the first embodiment.
Figure 3:
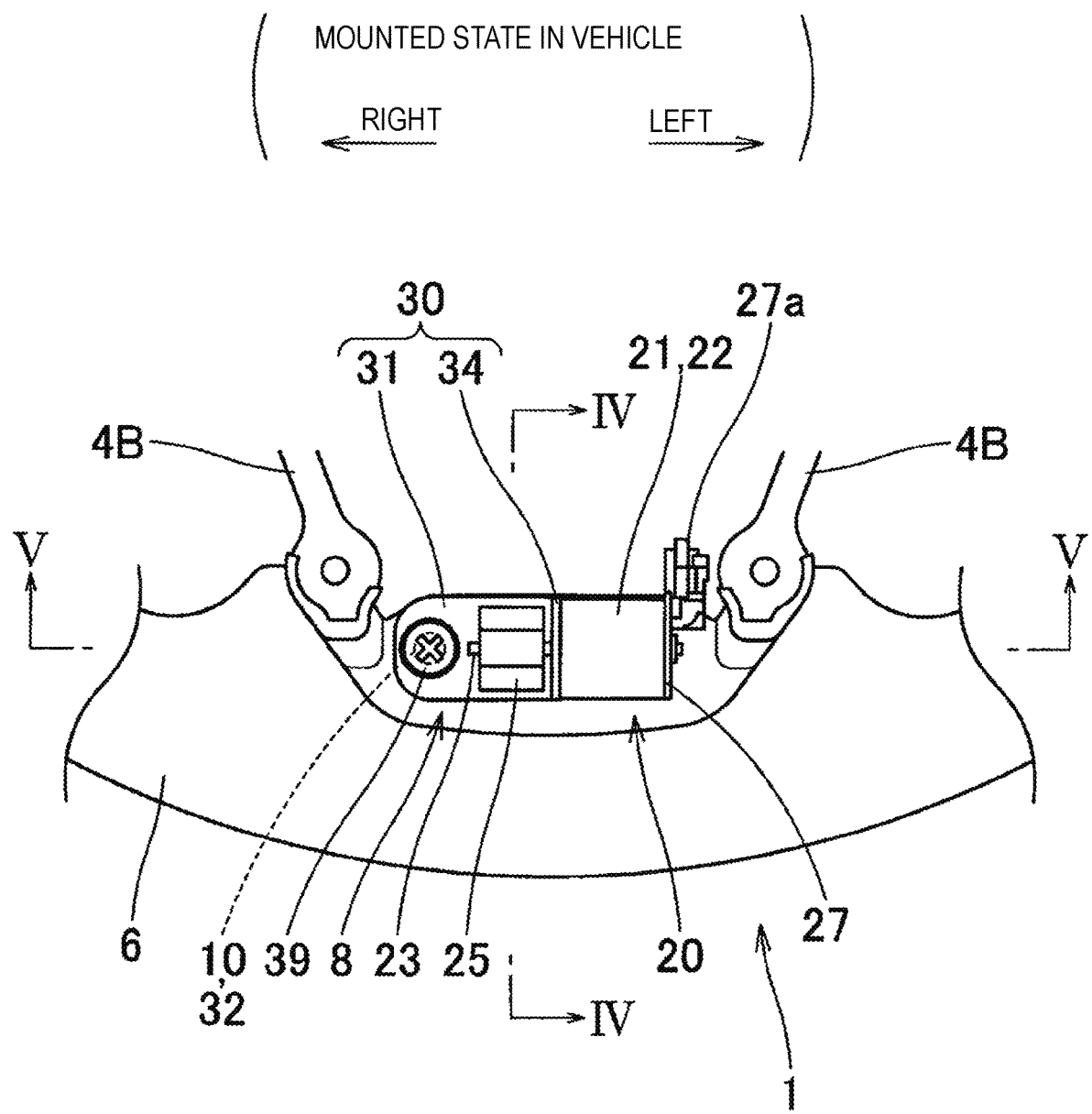
FIG. 3 is an enlarged plan view schematically illustrating a vicinity of the portion where the vibration device of the first embodiment is attached and illustrating a state reversed from a mounted state in a vehicle.

Hereinafter, a first embodiment of the invention will be described on the basis of the drawings. As illustrated in FIGS. 1 to 3, a steering wheel W of the first embodiment includes a vibration device 20 and a steering wheel body 1. The steering wheel body 1 includes a substantially annular ring part R which a driver grips during steering, a boss part B which is arranged in the center of the ring part R to be fastened to a steering shaft (not illustrated), and plural (in the first embodiment, three) spoke parts S which connect the ring part R and the boss part B. In addition, the steering wheel body 1 includes a core material 2 which is arranged to connect the ring part R, the boss part B, and the spoke part S. The core material 2 includes a boss core material 3 which is arranged in the boss part B, a spoke core material 4 which is arranged in the spoke part S, and a ring core material 5 which is arranged in the ring part R. Further, the core material 2 is formed such that the portion which is connected with a steering shaft (not illustrated) of the boss core material 3 is made of steel, and another portion is made of a light alloy material such as an aluminum alloy by die-casting.

The spoke core material 4 includes spoke core materials 4L and 4R in two left and right spoke parts SF (L, R) on a front side and spoke core materials 4B and 4B branched from the right and left sides of a spoke part SB on a rear side. The spoke core materials 4 are covered with the covers 17 (L, R, B) of a synthetic resin. The covers 17L, 17R, and 17B include an upper part 17A and a lower part 17B which are divided into two (see the two-dot chain line of FIG. 5) and cover the periphery of each spoke core material 4.

In the steering wheel body 1, a ring core material 5 is arranged, and a coating layer 6 made of a synthetic resin, such as urethane, having elasticity is arranged in the periphery of the spoke core material 4 near the ring core material 5.

A lower cover (not illustrated) made of a synthetic resin is arranged on the lower side of the boss part B, and a pad 16 provided in an air bag device (not illustrated) is arranged on the upper side of the boss part B.

As illustrated in FIGS. 1 and 3 to 6, the vibration device 20 is arranged to be attached to as attachment seat 8 provided on the back surface side of the crossing portion of the spoke part SB on the rear side and the ring part R. The attachment seat 8 is arranged to be provided with a space for a length dimension of the vibration device 20 in the lateral direction, such that the vibration device 20 can be arranged between two spoke core materials 4B and 4B on the rear side.

The vibration device 20 includes a vibration motor 21 attached with a weight 25 and an attachment bracket 30 and further includes a circuit board 27 provided with a connector 27a for connecting a lead wire (not illustrated) for supplying a driving power (DC12V) to the vibration motor 21. Incidentally, the circuit board 27 has an electronic circuit provided with an IC chip for eliminating electric noises. In addition, for example, when a traveling vehicle is deviated from a traveling lane, the driving power which is supplied from a predetermined control device to operate the vibration device 20 flows to the lead wire (not illustrated) connected to the connector 27*a* to operate the vibration motor 21 of the vibration device 20.

The vibration motor 21 includes a substantially cylindrical motor body 22, a rotary drive shaft 23 projecting from one end surface 22*a* of the motor body 22, and the weight 25 fixed to the rotary drive shaft 23. The motor body 22 is fixed to a holding piece 34 in such a manner that one end surface 22*a* side abuts on the holding piece 34 (to be illustrated) of the attachment bracket 30, and a screw 36 (see FIGS. 4 to 6) passes through the holding piece 34 to be tightened on the end surface 22*a* side. In addition, in the motor body 22, the circuit board 27 is clamped by the screw 37 on the end surface 22*b* side opposite to the end surface 22*a* where the rotary drive shaft 23 projects (see FIG. 5). Incidentally, as illustrated in FIG. 3, the rotary drive shaft 23 is arranged to be along the lateral direction during straight steering of the steering wheel W.

The circuit board 27 is arranged to project to the boss part B side on the obliquely lower side in a mounted state in the vehicle, so as to be along the spoke core material 4B from the inner peripheral side of the attachment seat 8 during attachment of the vibration device 20 to the attachment seat 8. Further, the circuit board is arranged with respect to the connector 27*a* of the tip such that the corresponding lead wire is fastened to extend from the boss part B side obliquely upward.

The weight 25 attached to the rotary drive shaft 23 is formed to be a plate shape having about one-third thickness of a circle, and a fitting hole 25*a* for fitting the rotary drive shaft 23 is arranged in an eccentric position.

As illustrated in FIGS. 3 to 6, the attachment bracket 30 is made of a sheet metal and includes an attachment piece 31 extending in a band shape in the lateral direction and a holding piece 34 which extends to be bent from an end part 31*e* of the attachment piece 31 and holds the vibration motor 21. In the case of the first embodiment, the holding piece 34 is curved from the end part 31*e* of the attachment piece 31 in an orthogonal direction and extends to the lower side (the lower side in the mounted state in the vehicle) of the attachment seat 8 in a substantially orthogonal direction (incidentally, FIGS. 3 to 6 illustrate the state reversed from the mounted state in the vehicle). A through hole 34*a* which penetrates the rotary drive shaft 23 of the vibration motor 21 is formed in the holding piece 34. In the peripheral edge of the through hole 34*a*, the screw 36 for attaching the motor body 22 is inserted into the holding piece 34 from the surface of the attachment piece 31 side to be screwed to the motor body 22.

In the attachment piece 31, an insertion hole 32 which is a circular opening for inserting the screw 39 for screw-clamping in the attachment seat 8 is formed on an end part 31*f* side which is an opposite side to the end part 31*e* of the holding piece 34 side to pass through in the vertical direction. In addition, a through hole 42 is arranged between the insertion hole 32 and the holding piece 34 in the attachment piece 31 to be closed in a circular shape. The through hole 42 forms an assembly concave part 41 through which a penetrating convex part 52 as an assembly convex part 51 (to be illustrated) of the attachment seat 8 penetrates to be fitted thereto. Each of the insertion hole 32 and the through hole 42 is arranged in the widthwise center of the attachment piece 31.

Figure 4:
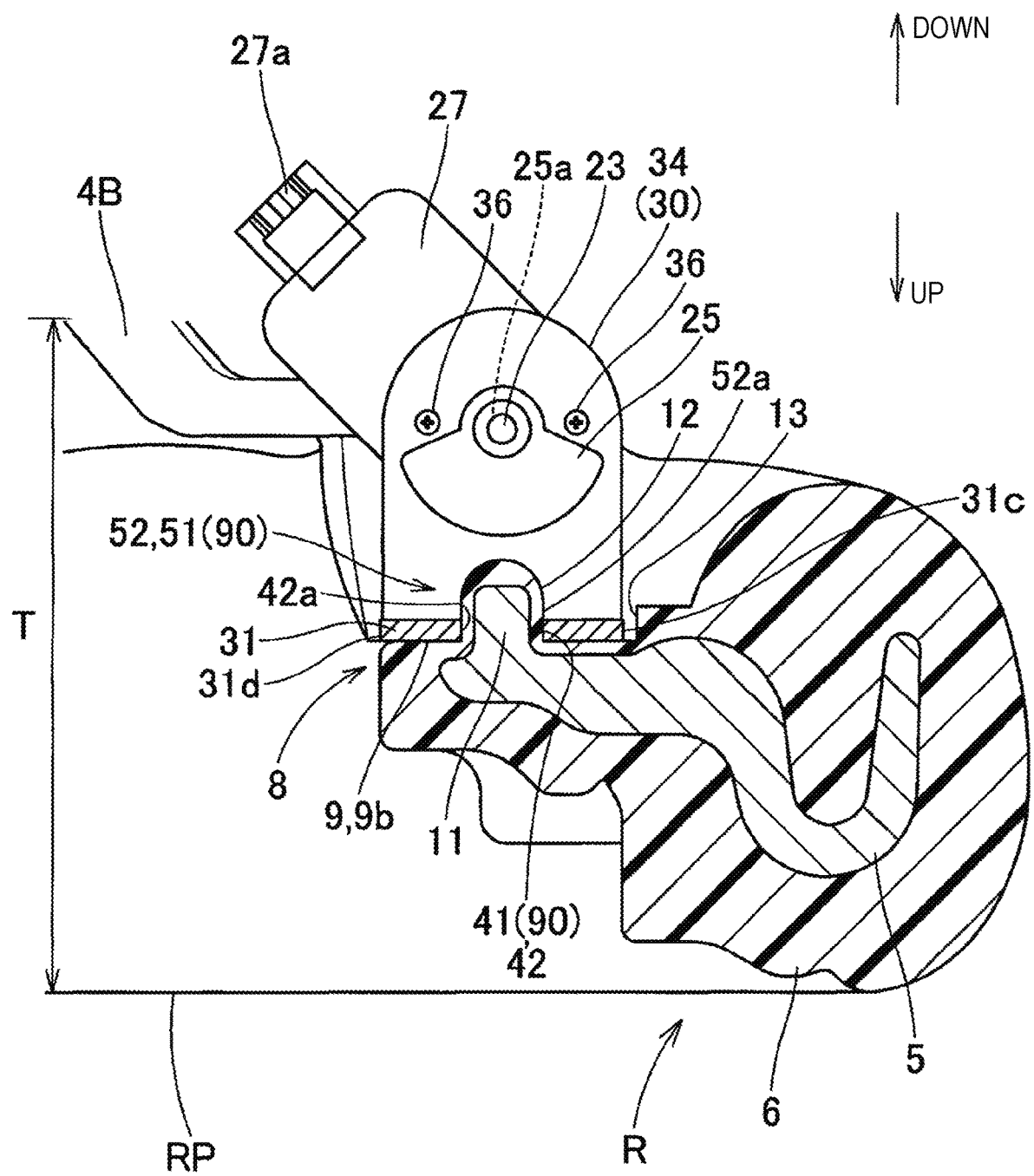
FIG. 4 is an enlarged sectional view schematically illustrating the portion taken along line IV-IV portion of FIG. 3 where the vibration device of the first embodiment is arranged.
Figure 5:
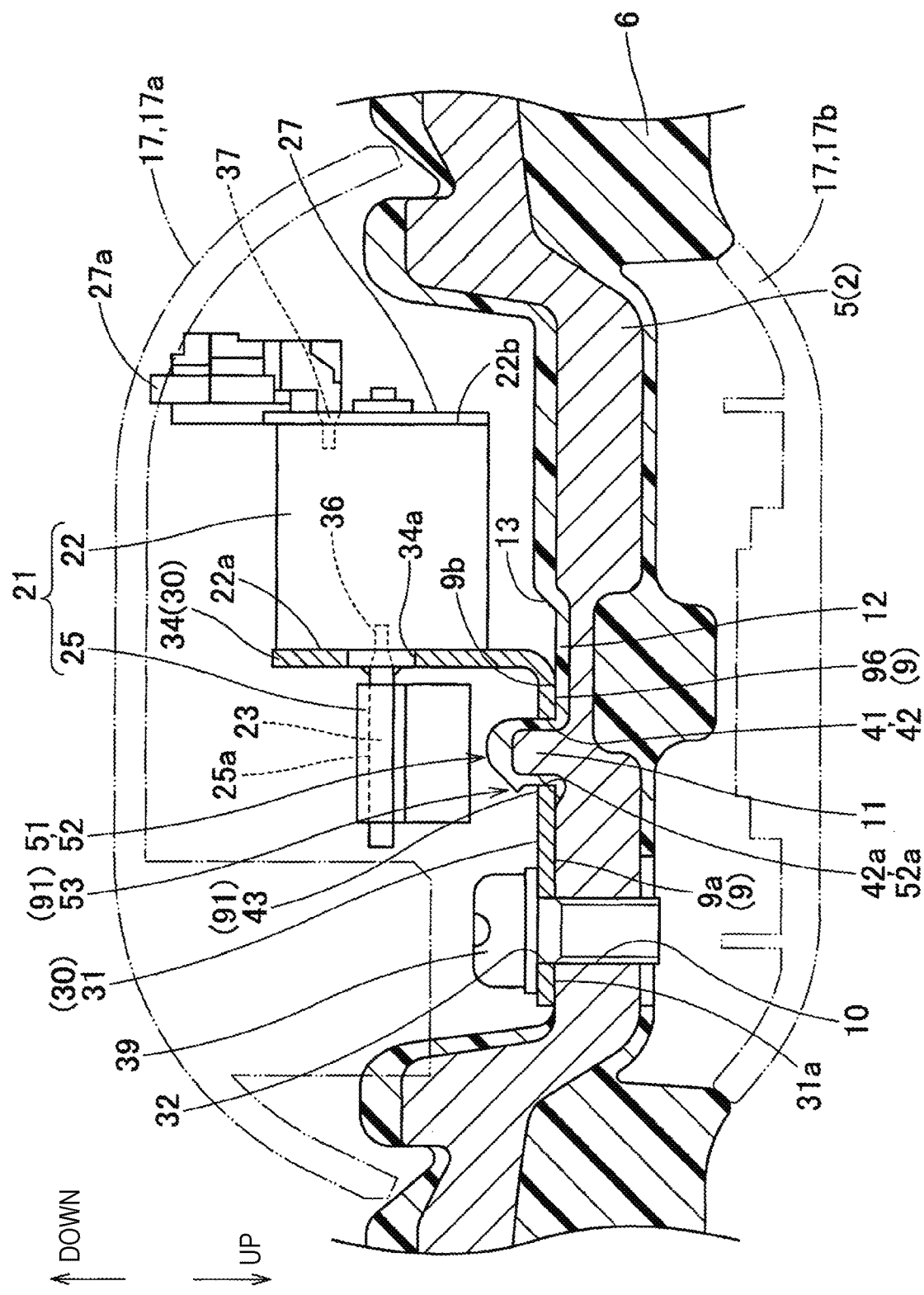
FIG. 5 is an enlarged sectional view schematically illustrating the portion taken along line V-V portion of FIG. 3 where the vibration device of the first embodiment is arranged.

Incidentally, the weight 25 of the vibration device 20 is arranged on the lower side (the lower side in the mounted state in the vehicle and the upper side in FIGS. 4 and 5) of the through hole 42.

Figure 8A:
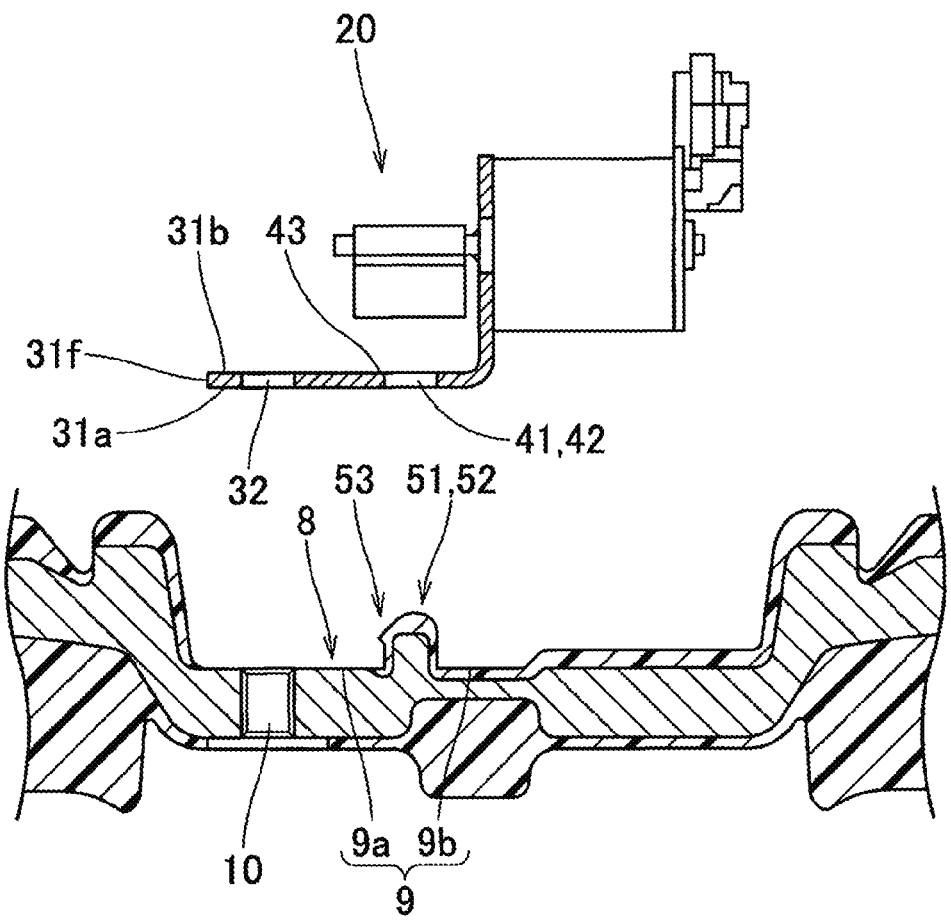
FIGS. 8A and 8B are sectional views schematically illustrating the portion of the rotation regulating unit compatible with a floating regulating unit before and after the vibration device of the first embodiment is arranged in the attachment seat.
Figure 8B:
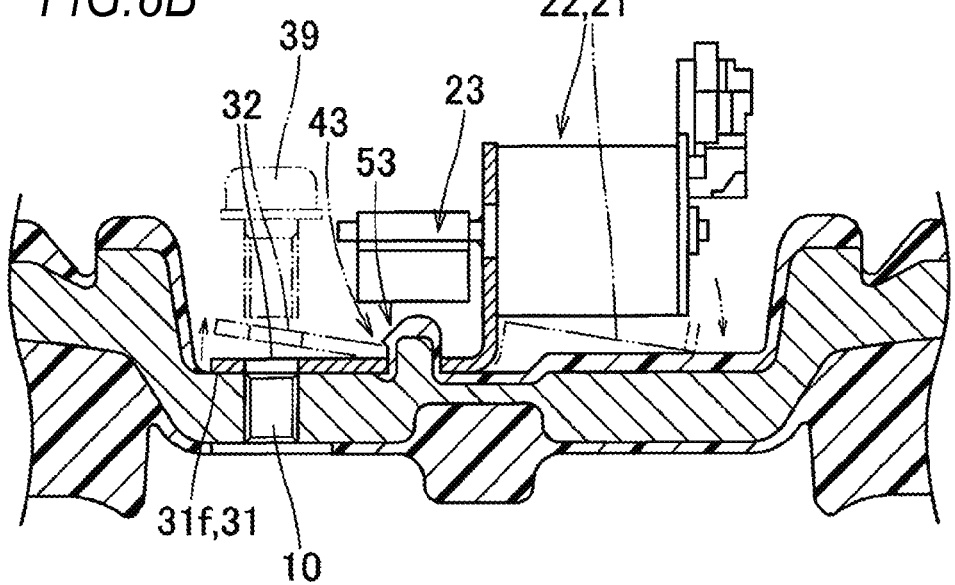

In the vibration device 20, when the back surface 31*a* of the attachment piece 31 is arranged along a horizontal direction as a state where the holding piece 34 extends upward, the motor body 22 side of the vibration motor 21 held by the holding piece 34 is heavier than the weight 25 side. Thus, the attachment piece 31 floats from a horizontal surface such that the holding piece 34 is inclined to the motor body 22 side, and the end part 31*f* side of the attachment piece 31 is lifted up (see the two-dot chain line of FIG. 8B).

In the attachment seat 8 of the steering wheel body 1 side to which the vibration device 20 is attached, an attachment hole 10 for fastening the screw 39 which is inserted through the insertion hole 32 of the attachment bracket 30 is formed on the right end side (the left end side in FIG. 3), and the penetrating convex part 52 forming the assembly convex part 51 protrudes near the center in the lateral direction. The vicinity of the attachment hole 10 in the attachment seat 8 is formed as a flat part 9 which abuts on the back surface 31*a* as the abutting side of the attachment piece 31. However, the vicinity of the attachment hole 10 is formed as a metal flat part 9*a* to expose the core material 5 such that a fastening force in the abutting state between the attachment piece 31 and the attachment seat 8 is enhanced during fastening of the screw 39 by using metal touch. The vicinity of the penetrating convex part 52 is formed as a coated flat part 9*b* provided with the coating layer 6 coating the core material 5 (see FIGS. 5 and 6). In the periphery of the coated flat part 9*b*, an elevated peripheral wall part 13 is arranged to surround a side surface 31*c* of the attachment piece 31 in the width direction and the end part 31*e*.

The penetrating convex part 52 of the first embodiment is configured such that a core-material protrusion part 11 extending from the core material 5 is coated with a coating part 12 extending from the coating layer 6. Further, in the coating part 12, a protrusion part 53 is formed on the attachment hole 10 side near the tip of the core-material protrusion part 11 to project in a flange shape.

The inner diameter dimension of the through hole 42 of the attachment piece 31 and the outer diameter dimension of the penetrating convex part 52 of the attachment seat 8 are dimensions in the state of being fitted to each other. The assembly concave part 41 and the assembly convex part 51 are assembled to be fitted to each other at the time of arranging the attachment piece 31 in the attachment seat 8, and the rotation regulating unit 90 regulates the rotation of the attachment piece 31 during fastening of the screw 39. Further, in the case of the first embodiment, in the protrusion part 53 of the penetrating convex part 52, the peripheral edge 43 of the through hole 42 can be locked after the penetrating convex part 52 is inserted to the through hole 42 while the attachment piece 31 is arranged from the upper side in the attachment seat 8 directed upward. That is, when the protrusion part 53 locks the peripheral edge 43 of the through hole 42, it is regulated that the attachment piece 31 floats from the attachment seat 8 due to the declining of the holding piece 34 holding the vibration motor 21 when the attachment piece 31 is arranged from the upper side to the attachment seat 8 (see the two-dot chain line of FIG. 8B). For this reason, the protrusion part 53 of the penetrating convex part 52 and the peripheral edge 43 of the through hole form a floating regulating unit 91 which regulates the floating of the attachment piece 31 from the attachment seat 8. Further, as described above, in the first embodiment, the through hole 42 and the penetrating convex part 52 also form the rotation regulating unit 90 and form a dual-use regulating unit 92 compatible with the floating regulating unit 91.

Incidentally, when the vibration device 20 is attached to the attachment seat 8, the flat part 9 of the attachment seat 8 is directed upward, that is, the steering wheel body 1 is arranged to be in the state reversed oppositely from the mounted state in the vehicle. The attachment piece 31 of the attachment bracket 30 of the vibration device 20 is arranged to abut on the flat part 9 of the attachment seat 8 from the upper side of the attachment seat 8 directed upward, and the insertion hole 32 is arranged to match with the attachment hole 10. As described above, at this time, the penetrating convex part 52 as the assembly convex part 51 is inserted and fitted into the through hole 42 as the assembly concave part 41.

When an assembly operation of the vibration device 20 is described, the circuit board 27 is clamped by the screw 37 in the end surface 22b of the motor body 22, and the circuit board 27 is attached to the motor body 22. Then, the end surface 22a of the motor body 22 abuts on the surface apart from the attachment piece 31 of the holding piece 34 while the rotary drive shaft 23 of the motor body 22 projects from the through hole 34a of the holding piece 34 of the attachment bracket 30. The screw 36 is fastened to the motor body 22 through the holding piece 34 so that the motor body 22 is attached to the holding piece 34. Thereafter, the rotary drive shaft 23 is fitted to the fitting hole 25a, the outer peripheral side of the fitting hole 25a is pressed to the rotary drive shaft 23 side, and the weight 25 is attached to the rotary drive shaft 23, so that the attachment operation of the vibration motor 21 in the attachment bracket 30 is completed, and the assembly of the vibration device 20 is completed.

In the assembled vibration device 20, the attachment operation is performed in a state where the steering wheel body 1 is reversed from the mounted state in the vehicle, and the attachment seat 8 is directed upward to be set to a predetermined jig. Further, as illustrated in FIGS. 7A, 7B, 8A, and 8B, the penetrating convex part 52 is inserted into the through hole 42, and the attachment piece 31 is arranged on the upper surface of the flat part 9 of the attachment seat 8, such that the insertion hole 32 of the attachment piece 31 in the attachment bracket 30 of the vibration device 20 matches with the attachment hole 10 of the attachment seat 8. At this time, when the penetrating convex part 52 is inserted into the through hole 42, the protrusion part 53 of the penetrating convex part 52 can lock the peripheral edge 43 of the through hole 42 and the action of the floating regulating unit 91 is exerted. Thus, a behavior of floating from the attachment seat 8 (for example, a behavior that the attachment piece 31 separates the insertion hole 32 from the attachment hole 10) is regulated by the weight of the motor body 22, and the insertion hole 32 is not deviated from the upper side of the attachment hole 10 although an operator takes his hand off the vibration device 20. For this reason, the screw 39 can be easily inserted into the attachment hole 10 through the insertion hole 32. Thereafter, the screw 39 may be simply rotated in a screwing direction. Further, even when the attachment piece 31 tries to rotate about the insertion hole 32 in the direction of rotating during fastening of the screw 39 during fastening of the screw 39, an inner peripheral surface 42a of the through hole 42 as the assembly concave part 41 is regulated by an outer peripheral surface 52a of the penetrating convex part 52 as the assembly convex part 51, and the rotation of the attachment piece 31 is regulated (see FIG. 7B). Thus, the action of the rotation regulating unit 90 is exerted so that the screw 39 can be fastened smoothly. The attachment piece 31 can be attached and fixed in the attachment seat 8. The vibration device 20 can be attached to the attachment seat 8 of the ring core material 5.

Thereafter, excluding the pad 16, the covers 17 (L, B, R) and the lower cover (not illustrated) are attached to the steering wheel body 1, and the steering wheel body 1 is attached to the steering shaft of the vehicle. Then, the pad 16 equipped with an air bag device is assembled in the boss part B while a lead wire for inputting an operation signal to the air bag device (not illustrated) or a predetermined lead wire for operating the vibration device 20 is connected to the connector 27a, so that the steering wheel W provided with the vibration device 20 can be mounted in the vehicle.

When the traveling vehicle is deviated from the traveling lane after the steering wheel W is mounted in the vehicle, a driving power is supplied to the vibration motor 21 of the vibration device 20 by a predetermined control device, and the motor body 22 rotates the rotary drive shaft 23 attached with the eccentric weight 25 to vibrate the ring core material 5, thereby notifying the driver who grips the vibrating ring part R during steering of the fact that the traveling vehicle is deviated from the traveling lane.

In the steering wheel W of the first embodiment, when the insertion hole 32 in the attachment piece 31 of the attachment bracket 30 of the vibration device 20 is arranged in the attachment hole 10 in the attachment seat 8 of the ring core material 5, and the screw 39 is fastened to the attachment hole 10 through the insertion hole 32, the attachment seat 8 and the attachment bracket 30 correspond to each other such that the floating regulating unit 91 and the rotation regulating unit 90 are arranged. Further, the floating regulating unit 91 regulates that the attachment piece 31 floats from the attachment seat 8 when the attachment piece 31 is arranged in the attachment seat 8, that is, the attachment seat 8 floats from the attachment hole 10 in the insertion hole 32 of the attachment piece 31 (see the two-dot chain line of FIG. 8B). Thus, the screw 39 for insertion in the attachment hole 10 through the insertion hole 32 is inserted easily. In addition, the rotation regulating unit 90 regulates that the attachment piece 31 is rotated when the screw 39 is fixed in the attachment seat 8. Thus, after the screw 39 is inserted through the insertion hole 32 into the attachment hole 10, the screw 39 can be fastened to the attachment hole 10 simply by rotating the screw 39 without firmly holding the attachment bracket 30 additionally, and the fastening operation of the screw 39 is performed efficiently, so that the attachment bracket 30 is easily attached to the attachment seat 8.

Therefore, in the steering wheel W of the first embodiment, even when the attachment bracket 30 of the vibration device 20 is configured to be attached to the attachment seat 8 of the ring core material 5 by one screw 39, the attachment operation is performed easily.

Further, in the steering wheel W of the first embodiment, the rotation regulating units 90 are assembled to be fitted to each other when the attachment piece 31 is arranged in the attachment seat 8 and are configured by the through hole 42 as the assembly concave part 41 and the penetrating convex part 52 as the assembly convex part 51 which are arranged in correspondence with the attachment seat 8 and the attachment piece 31.

For this reason, in the first embodiment, when the attachment piece 31 of the attachment bracket 30 is arranged in the attachment seat 8, the action of the rotation regulating unit 90 can be exerted only by a simple assembly operation of simply fitting the corresponding assembly concave part 41 and assembly convex part 51. Thus, the assembly operation is easily performed when the attachment piece 31 of the attachment bracket 30 is arranged in the attachment seat 8 (see FIGS. 7A, 7B, 8A, and 8B).

Particularly, in the first embodiment, the assembly concave part 41 and the assembly convex part 51 of the rotation regulating unit 90 can regulate that the attachment piece 31 floats from the attachment seat 8 and are compatible with the floating regulating unit 91. That is, in the first embodiment, the assembly concave part 41 is formed as the through hole 42 provided in the attachment piece 31, and the assembly convex part 51 is formed as the penetrating convex part 52 provided in the attachment seat 8 to penetrate through the through hole 42 as the assembly concave part 41 provided in the attachment piece 31. The protrusion part 53 is provided which locks the peripheral edge 43 of the through hole 42 as the penetrated assembly concave part 41 and regulates the floating of the attachment piece 31 from the attachment seat 8.

For this reason, in the first embodiment, when the attachment piece 31 is arranged in the attachment seat 8, the penetrating convex part 52 as the assembly convex part 51 of the attachment seat 8 is inserted into the through hole 42 as the assembly concave part 41 of the attachment piece 31. At this time, the protrusion part 53 of the penetrating convex part 52 locks the peripheral edge 43 of the through hole 42. Thus, when the attachment piece 31 of the attachment bracket 30 is arranged in the attachment seat 8, the action of the rotation regulating unit 90 and the floating regulating unit 91 can be exerted only by simply inserting the penetrating convex part 52 as the assembly convex part 51 into the through hole 42 as the assembly concave part 41, whereby the assembly operation is performed easily.

Figure 6:
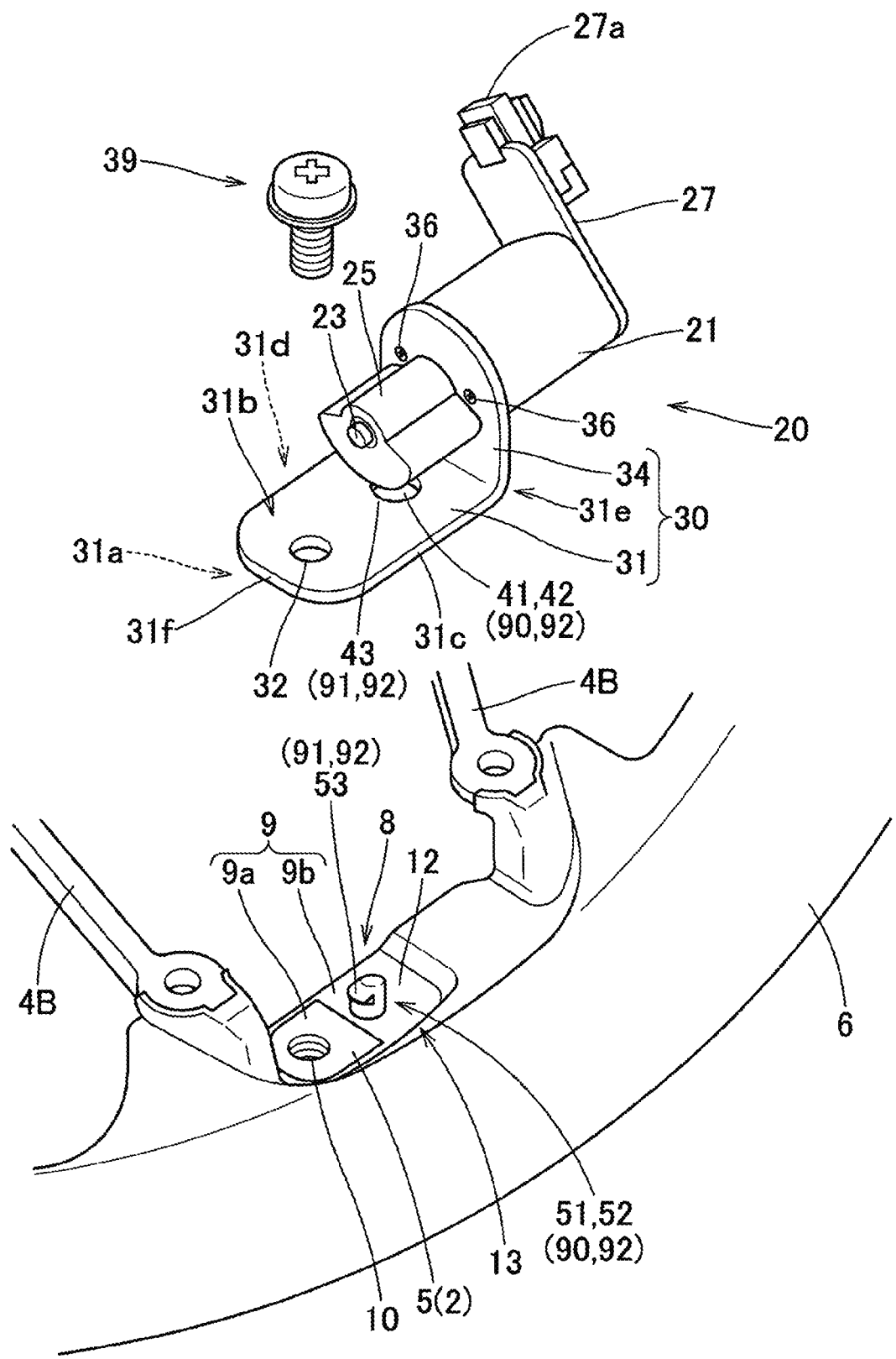
FIG. 6 is a partial perspective view schematically illustrating the vibration device and an attachment seat of a core metal in the first embodiment.
Figure 7A:
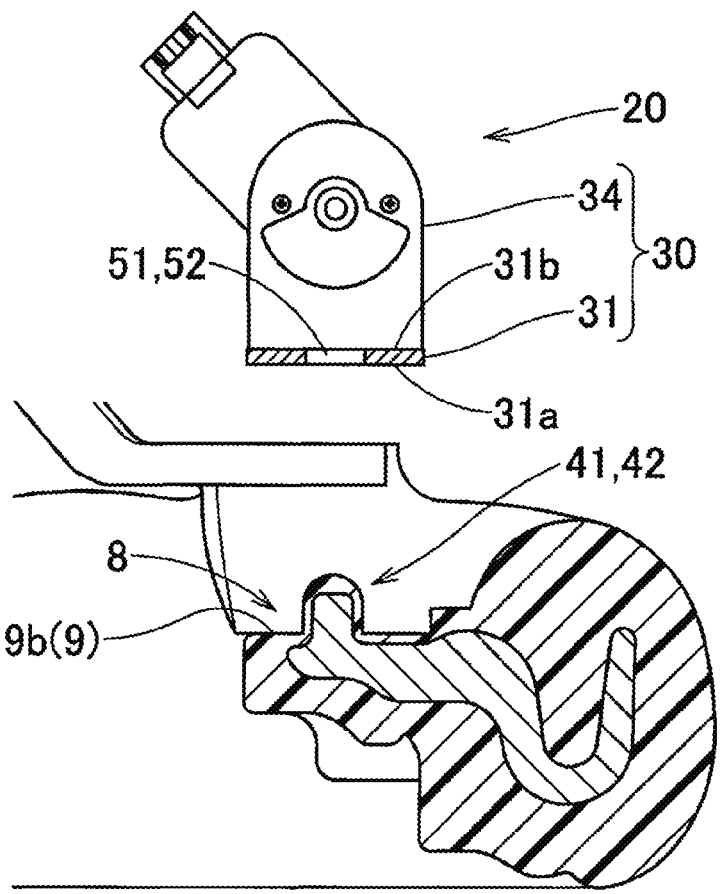
FIGS. 7A and 7B are sectional views schematically illustrating a portion of a rotation regulating unit before and after the vibration device of the first embodiment is arranged in the attachment seat.
Figure 7B:
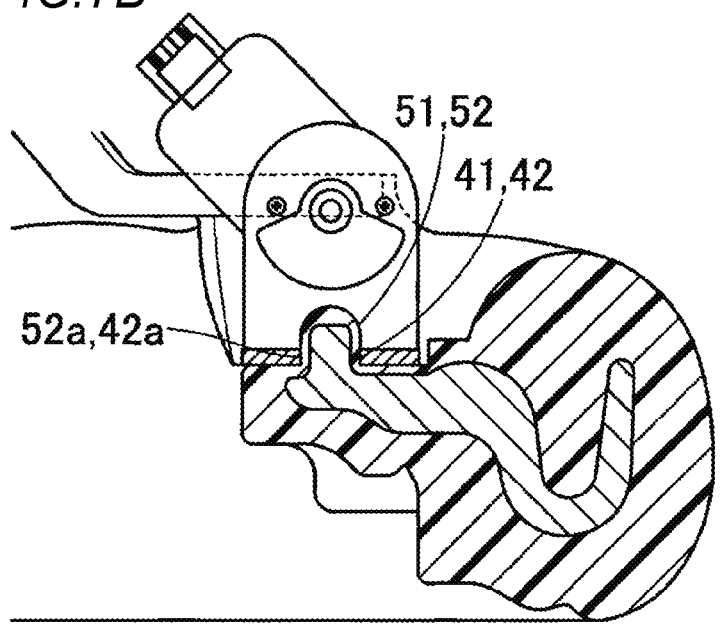

In the steering wheel W of the first embodiment, in order that the peripheral edge of the attachment hole 10 of the attachment seat 8 abuts on the metal attachment piece 31 of the attachment bracket 30, the penetrating convex part 52 as the portion of the rotation regulating unit 90 on the attachment seat 8 side and the floating regulating unit 91 is configured as a metal flat part 9a for exposing the metal core material 5 is configured by arranging the coating layer (coating part) 12 having the elasticity for coating the core material 5 (see FIGS. 5 and 6).

For this reason, in the first embodiment, when the attachment piece 31 is clamped by the screw 39 to be attached to the attachment seat 8, the attachment piece 31 can be attached to the attachment seat 8 by the metal touch between metal materials in the portion where the fastening force of the screw 39 is applied, and the attachment piece 31 can attached to the attachment seat 8 by a strong fastening force. Further, the portion of the rotation regulating unit 90 or the floating regulating unit 91 on the attachment seat 8 side, that is, the penetrating convex part 52 having the protrusion part 53 is configured such that the core-material protrusion part 11 extending from the metal core material 5 itself is coated with the elastic coating layer (coating part) 12. When the attachment piece 31 is arranged in the attachment seat 8, by providing a slight gap in a range where the action of the rotation regulating unit 90 or the floating regulating unit 91 can be exerted, abnormal sound can be prevented even when the penetrating convex part 52 which is the portion of the rotation regulating unit 90 or the floating regulating unit 91 on the attachment seat 8 side and the attachment piece 31 which is a corresponding metal portion of the attachment bracket 30 come into contact with each other during vehicle traveling. On the contrary, the penetrating convex part 52 which is the portion of the rotation regulating unit 90 or the floating regulating unit 91 on the attachment seat 8 side and the corresponding metal attachment piece 31 of the attachment bracket 30 can be configured to have a marginal assembly dimension, so as not to interfere with each other strongly when the attachment piece 31 is arranged in the attachment seat 8. Thus, the assembly operation of arranging the attachment piece 31 in the attachment seat 8 can be performed easily.

Incidentally, the assembly concave part and the assembly convex part of the rotation regulating unit can regulate the floating of the attachment piece from the attachment seat, and are configured to be compatible with the floating regulating unit. Like the steering wheel WA illustrated in FIG. 9, a protrusion piece 55 as an assembly convex part 51A is provided in the end part 31$f$ of the attachment piece 31A, and an insertion hole 45 as an assembly concave part 41A is provided in the attachment seat 8A such that the protrusion piece 55 as the assembly convex part 51A provided in the attachment piece 31A is inserted thereto. An abutting part 46 is provided which abuts on the protrusion piece 55 which is the assembly convex part 51A and regulates the floating of the attachment piece 31A from the attachment seat 8A when the attachment piece 31A in the inserted protrusion piece 55 as the assembly convex part 51A is tilted in a floating direction.

Incidentally, the protrusion piece 55 protrudes to the lower side of the back surface 31$a$ from the end part 31$f$ of the attachment piece 31A. Although the protrusion piece tries to rotate about the insertion hole 32 when the screw 39 is fastened after insertion into the insertion hole 45, the protrusion piece is regulated by the side surface 45$a$ of the attachment piece 31A in the width direction, so as to be prevented from being rotated. In this way, the rotation regulating unit 90A is configured. In addition, the abutting part 46 is a portion which faces the outer side surface 55$a$ of the protrusion piece 55 when the protrusion piece 55 is inserted in the inner peripheral surface of the insertion hole 45.

Figure 9:
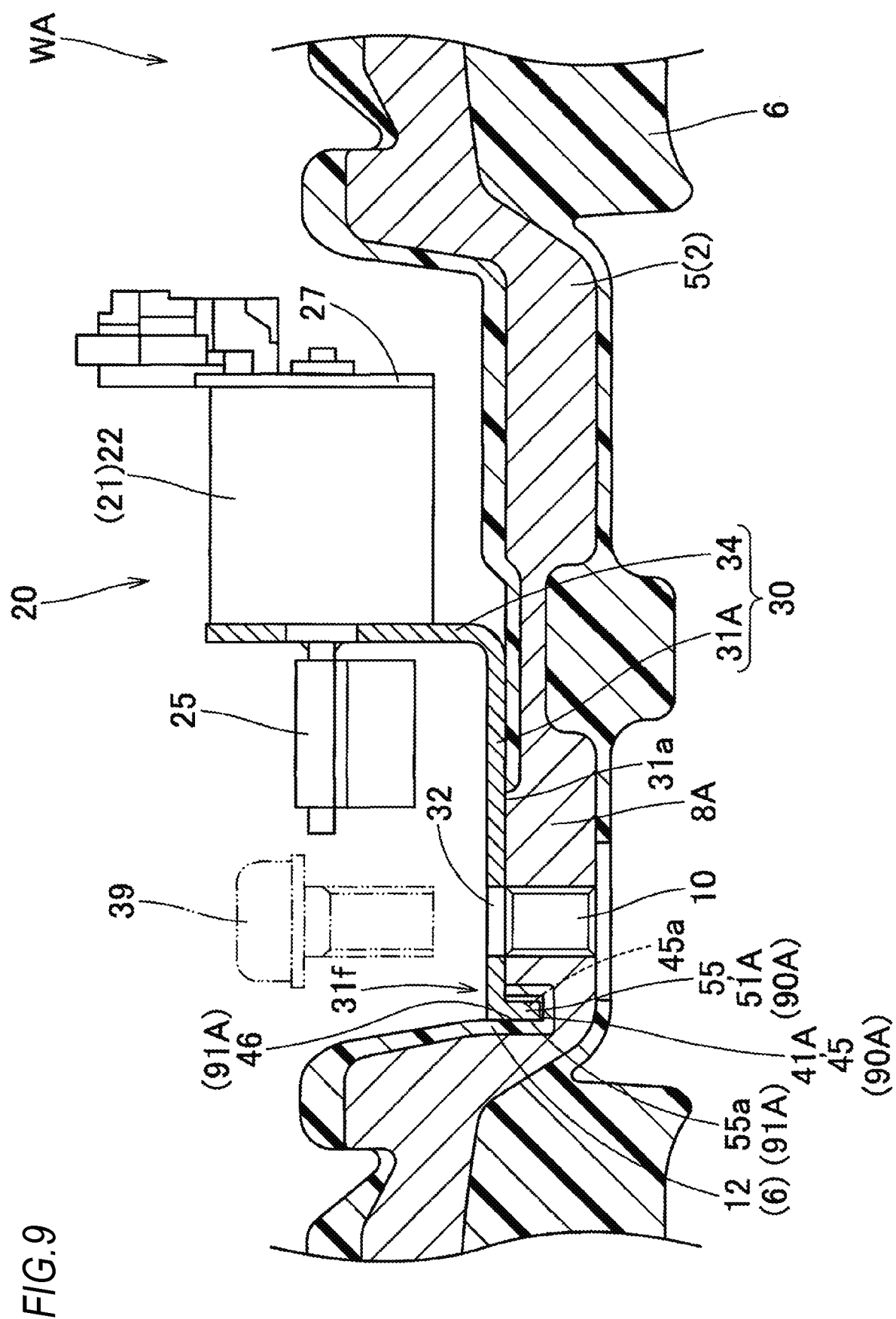
FIG. 9 is a sectional view schematically illustrating the rotation regulating unit compatible with a floating regulating unit in a modification of the first embodiment.

That is, in the configuration illustrated in FIG. 9, the assembly concave part 41A and the assembly convex part 51A of the rotation regulating unit 90A can regulate the floating of the attachment piece 31A from the attachment seat 8A, and is configured to be compatible with a floating regulating unit 91A.

The coating part 12 formed by extending the coating layer 6 is arranged in the inner peripheral surface of the insertion hole 45 so as to prevent the generation of the abnormal sound.

For this reason, in the steering wheel WA illustrated in FIG. 9, when the attachment piece 31A is arranged in the attachment seat 8A, and the protrusion piece 55 as the assembly convex part 51A of the attachment piece 31A is inserted into the insertion hole 45 of the assembly concave part 41A of the attachment seat 8A, the abutting part 46 of the assembly concave part 41A can regulate the tilting of the protrusion piece 55 as the assembly convex part 51A. Thus, when the attachment piece 31A of the attachment bracket 30 is arranged in the attachment seat 8A, the assembly operation is easily performed simply by inserting the protrusion piece 55 of the assembly convex part 51A into the insertion hole 45 of the assembly concave part 41A.

Incidentally, in the case of the first embodiment, as illustrated in FIG. 4, the peripheral wall part 13 is arranged on the attachment seat 8 side to face the side surface 31c of the attachment piece 31. The peripheral wall part 13 abuts on the side surface 31c during the fastening of the screw 39 to regulate the rotation of the attachment piece 31. Thus, the rotation regulating unit may be configured by the peripheral wall part 13 and the side surface 31c.

Figure 10:
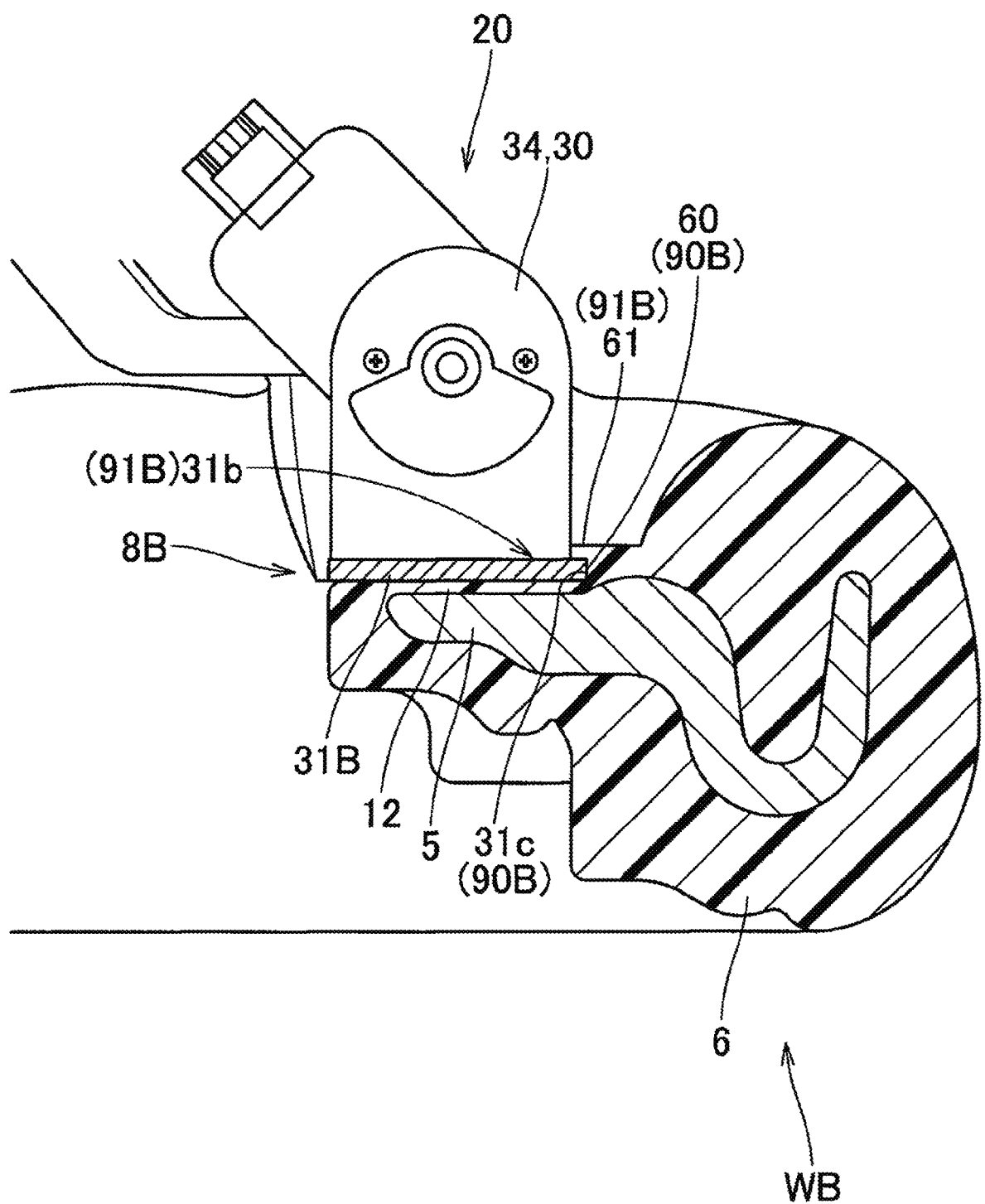
FIG. 10 is a sectional view schematically illustrating the rotation regulating unit compatible with a floating regulating unit in another modification of the first embodiment.

That is, like the steering wheel WB illustrated in FIG. 10, the rotation regulating unit 90B may be configured such that a regulation part (regulation wall) 60 which is formed by a portion of the peripheral wall part 13 which regulates the side surface 31C of the attachment piece 31B during screw-clamping is arranged on the attachment seat 8B side. The peripheral wall part 13 having the regulation part 60 extends from the coating layer 6 and is arranged in the coating part 12 covering the ring core material 5.

In such a configuration, when the attachment piece 31B is arranged in the attachment seat 8B, the side surface 31c of the attachment piece 31B faces the regulation part 60 on the attachment seat 8B side, and the side surface 31c of the attachment piece 31B abuts on the regulation part 60 on the attachment seat 8B side during screw-clamping, so as to regulate the rotation of the attachment piece 31B. Thus, the screw 39 (not illustrated) can be fastened smoothly.

In the steering wheel WB illustrated in FIG. 10, the regulation part 60 includes a lock part 61 which regulates the surface 31B on an opposite side to the attachment seat 8B in the attachment piece 31B and is arranged to form the floating regulating unit 91B. Incidentally, when the side surface 31c of the attachment piece 31B of the attachment bracket 30 is slid to the regulation part 60 side, the attachment piece 31B can be easily set on the lower side of the lock part 61. In addition, the lock part 61 is formed from the elastic coating layer 6 such as a urethane. Although the lock part 61 is bent and restored, the attachment piece 31B can be arranged to the lower side of the lock part 61.

In the steering wheel WB, an attachment operation is simplified such that when the attachment piece 31B of the attachment bracket 30 is arranged in the attachment seat 8B, the attachment piece 31B is locked by the lock part 61 of the regulation part 60, and the side surface 31C of the attachment piece 31B is arranged to face the regulation part 60 on the attachment seat 8B side. With the simple attachment operation, the floating of the attachment piece 31B and the rotation of the attachment piece 31B during screw-clamping can be regulated, and the attachment operation at the time of arranging the attachment piece 31B of the attachment bracket 30 in the attachment seat 8B is performed easily.

Incidentally, the lock part 61 is formed by the coating part 12 having elasticity but is formed to secure the locking force capable of regulating the floating of the attachment piece 31B.

Figure 11:
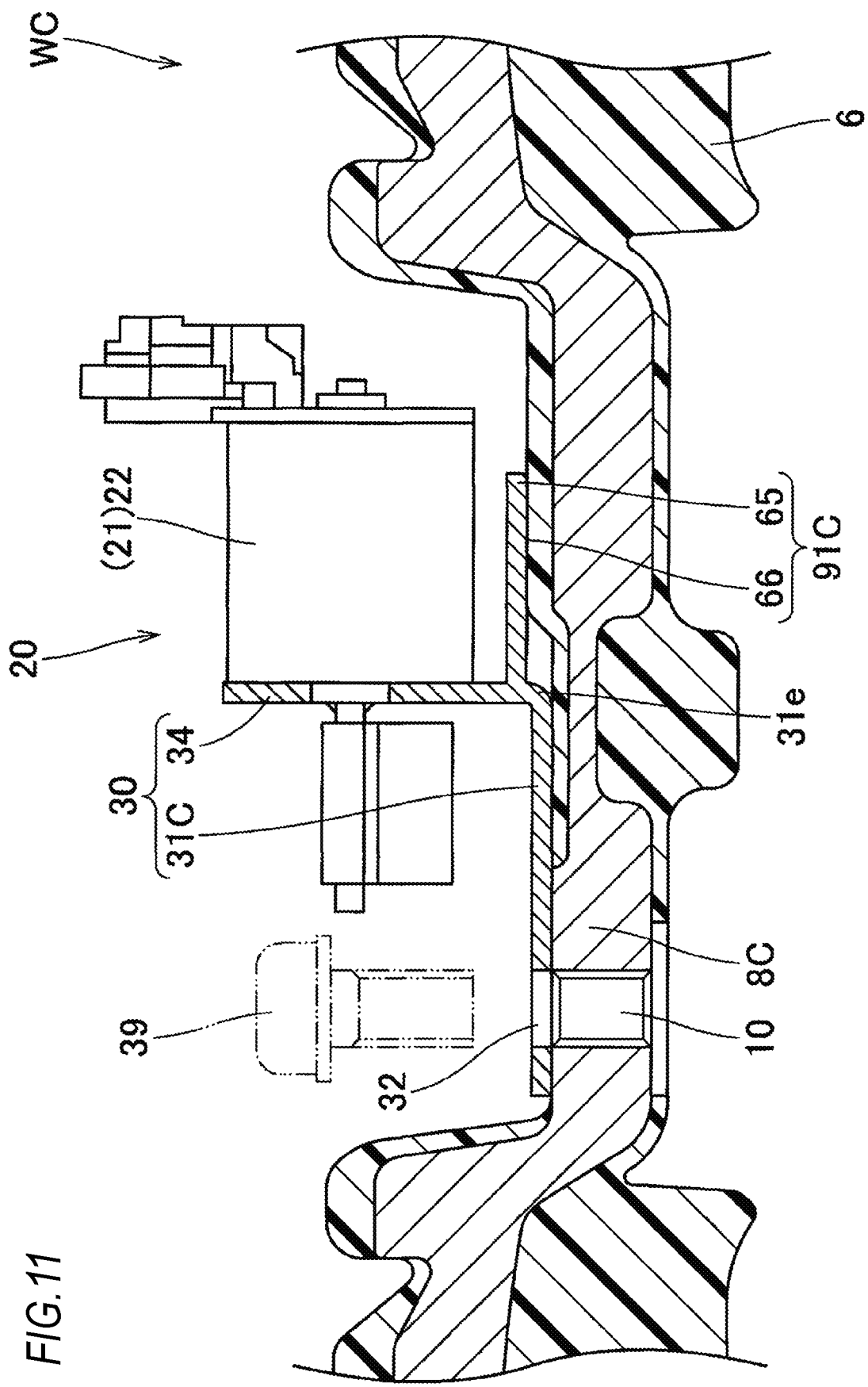
FIG. 11 is a sectional view schematically illustrating the floating regulating unit of still another modification of the first embodiment.

The floating regulating unit may be configured as in a steering wheel WC illustrated in FIG. 11. The floating regulating unit 91C of the steering wheel WC extends beyond the holding piece 34 in a direction away from the insertion hole 32 of the attachment piece 31C. The floating regulating unit is configured such that a regulating piece 65 is arranged to abut on a vicinity of the attachment seat 8C when the attachment piece 31C is tilted in a floating direction.

In the steering wheel WB, when the attachment piece 31C is arranged in the attachment seat 8C, the regulating piece 65 abuts on a regulation surface 66 near the attachment seat 8C. Thus, it is possible to regulate that the attachment seat 8C floats from the attachment hole 10 in the insertion hole 32 of the attachment piece 31C, and the screw 39 can be simply inserted through the insertion hole 32 into the attachment hole 10.

Incidentally, in the first embodiment, a case is described in which the attachment seat 8 is arranged on the back surface (lower surface) side of the ring core material 5 in the mounted state in the vehicle. However, the attachment seat 8 may be arranged on the surface (upper surface) side of the mounted state in the vehicle in the ring core material 5.

In the first embodiment, the vibration device 20 is configured to be attached to the portion of the ring core material 5. However, an attachment seat 8D may be provided in the portion of another core material (for example, the portion of the core material 2 of the spoke part S, that is, the spoke core material 4 (4C) in the steering wheel WD of the second embodiment illustrated in FIGS. 12 to 17), and the vibration device 20 may be attached.

Figure 12:
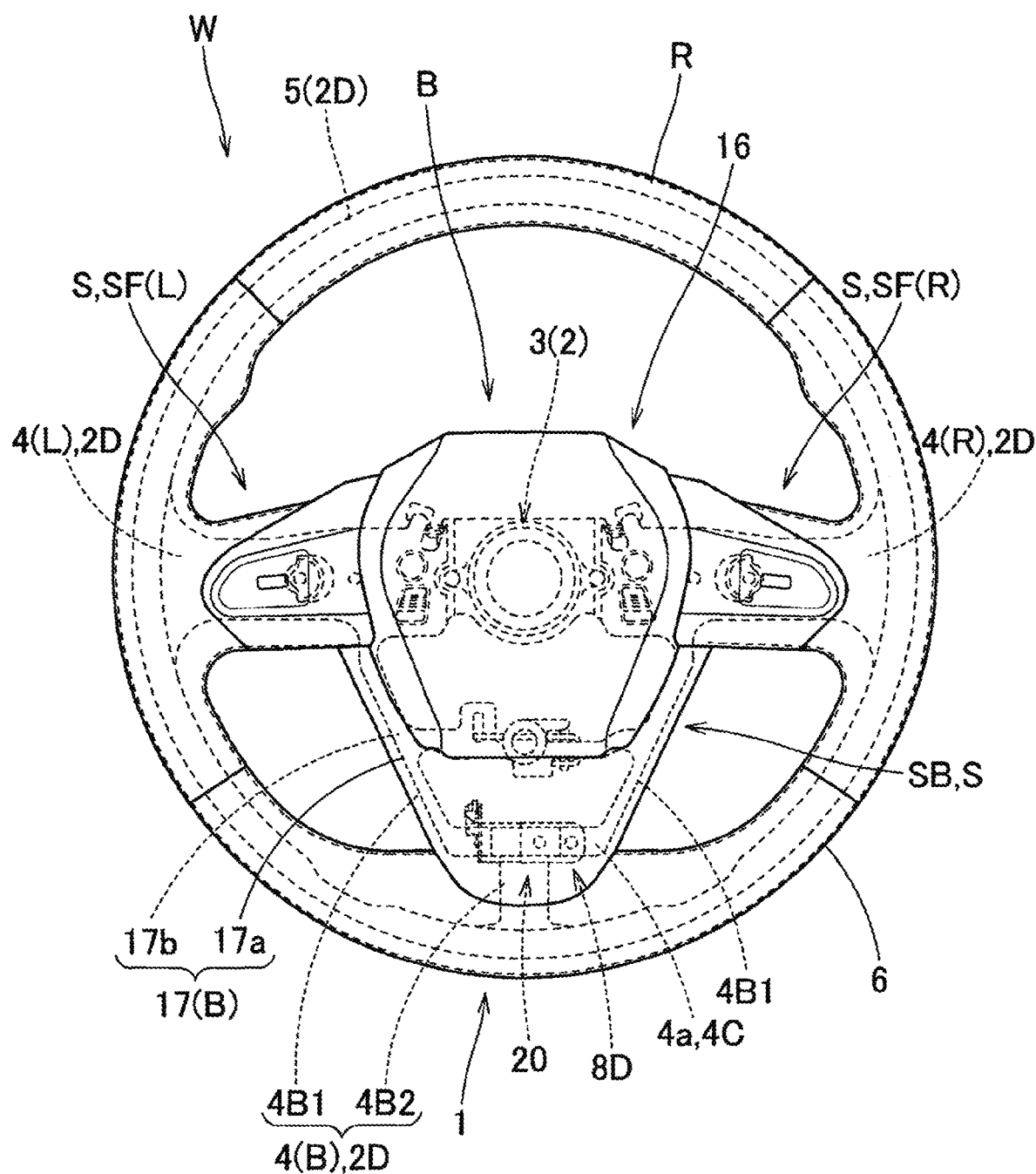
FIG. 12 is a schematic plan view of a steering wheel of a second embodiment.
Figure 13:
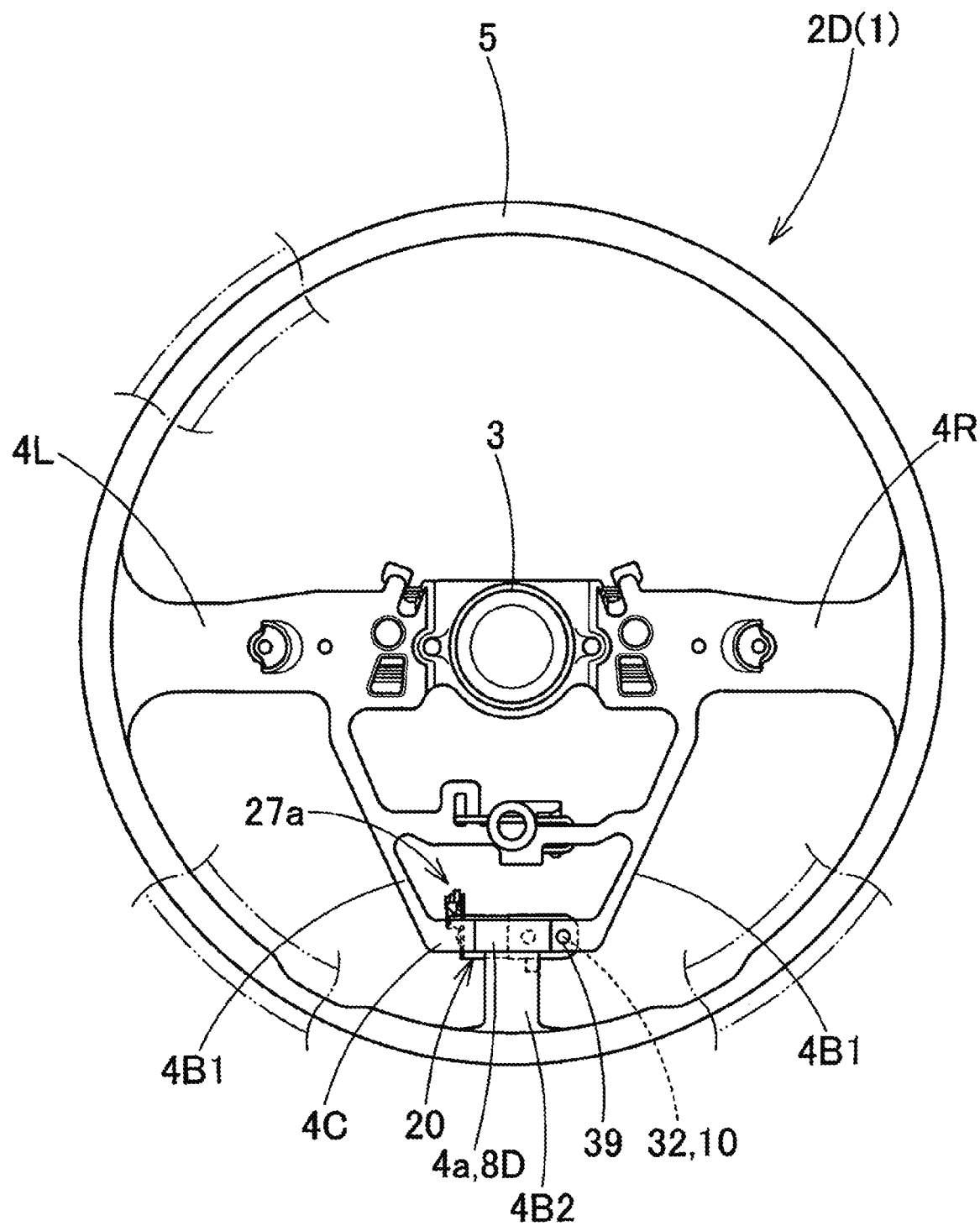
FIG. 13 is a schematic plan view illustrating a core material of the steering wheel of the second embodiment.
Figure 14:
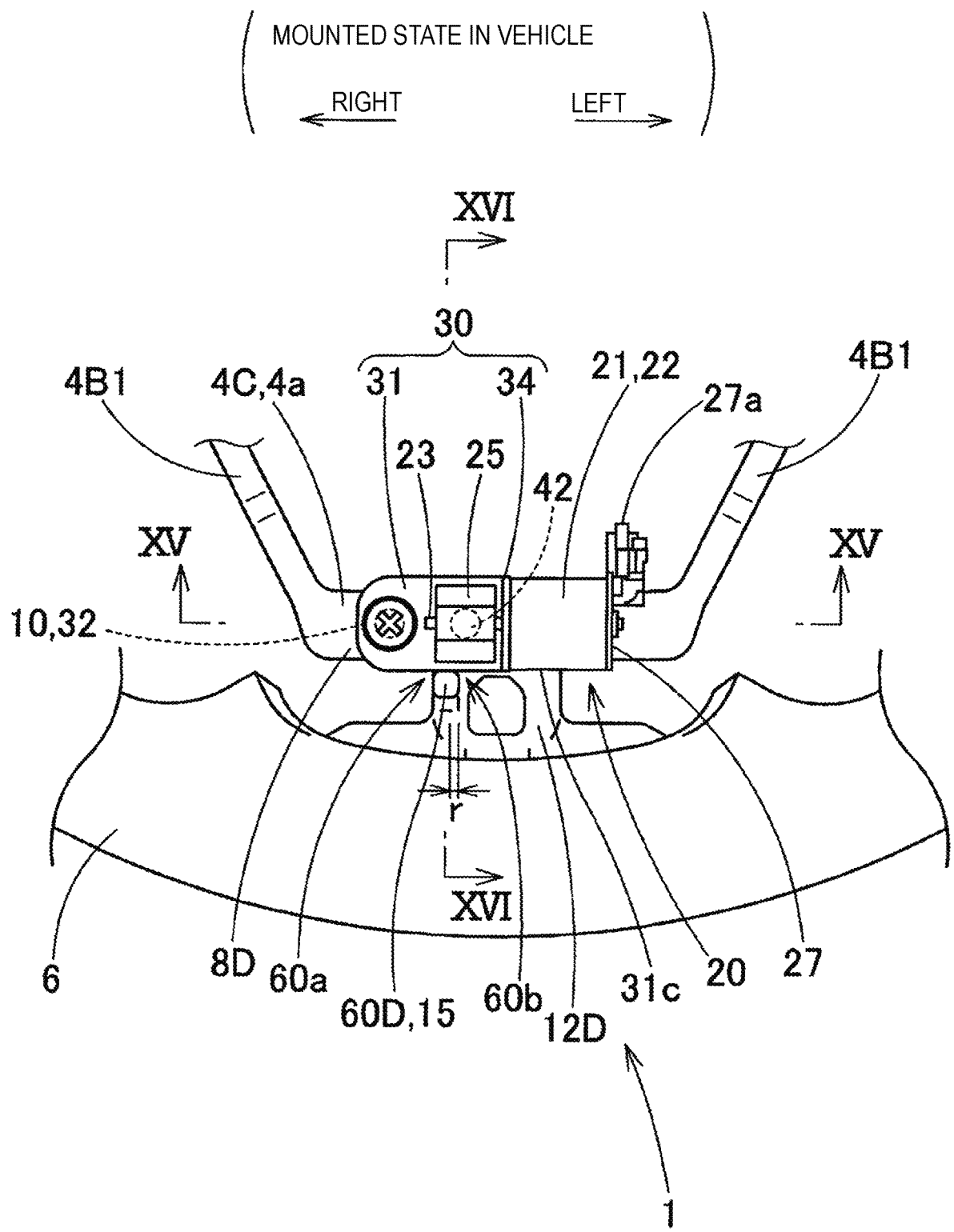
FIG. 14 is an enlarged plan view schematically illustrating a vicinity of the portion where the vibration device of the second embodiment is attached and illustrating the state reversed from a mounted state in a vehicle.

In the steering wheel WD of the second embodiment, as illustrated in FIGS. 12 and 13, core materials 2D of the steering wheel body 1 which connect the ring part R, the boss part B, and the spoke part S include the ring core material 5, the boss core material 3, and the spoke core materials 4 (L, R, B). In the spoke core material 4B on the rear portion side, the rear end sides of two right and left spoke core materials 4B1 and 4B1 extending to the rear side from the boss core material 3 are connected to each other by the spoke core material 4C formed by a connection rod part 4a extending in the lateral direction. Further, one spoke core material 4B2 extending to the rear side is provided near the lateral center of the spoke core material 4C formed by the connection rod part 4a, thereby forming the connection configuration of the boss core material 3 and the ring core material 5. Further, the attachment seat 8D for attaching the vibration device 20 is arranged in the spoke core material 4C (connection rod part 4a). That is, the attachment seat 8D for attaching the vibration device 20 is arranged in the portion of the spoke part SB apart from the ring part R to the boss part B side.

Figure 15:
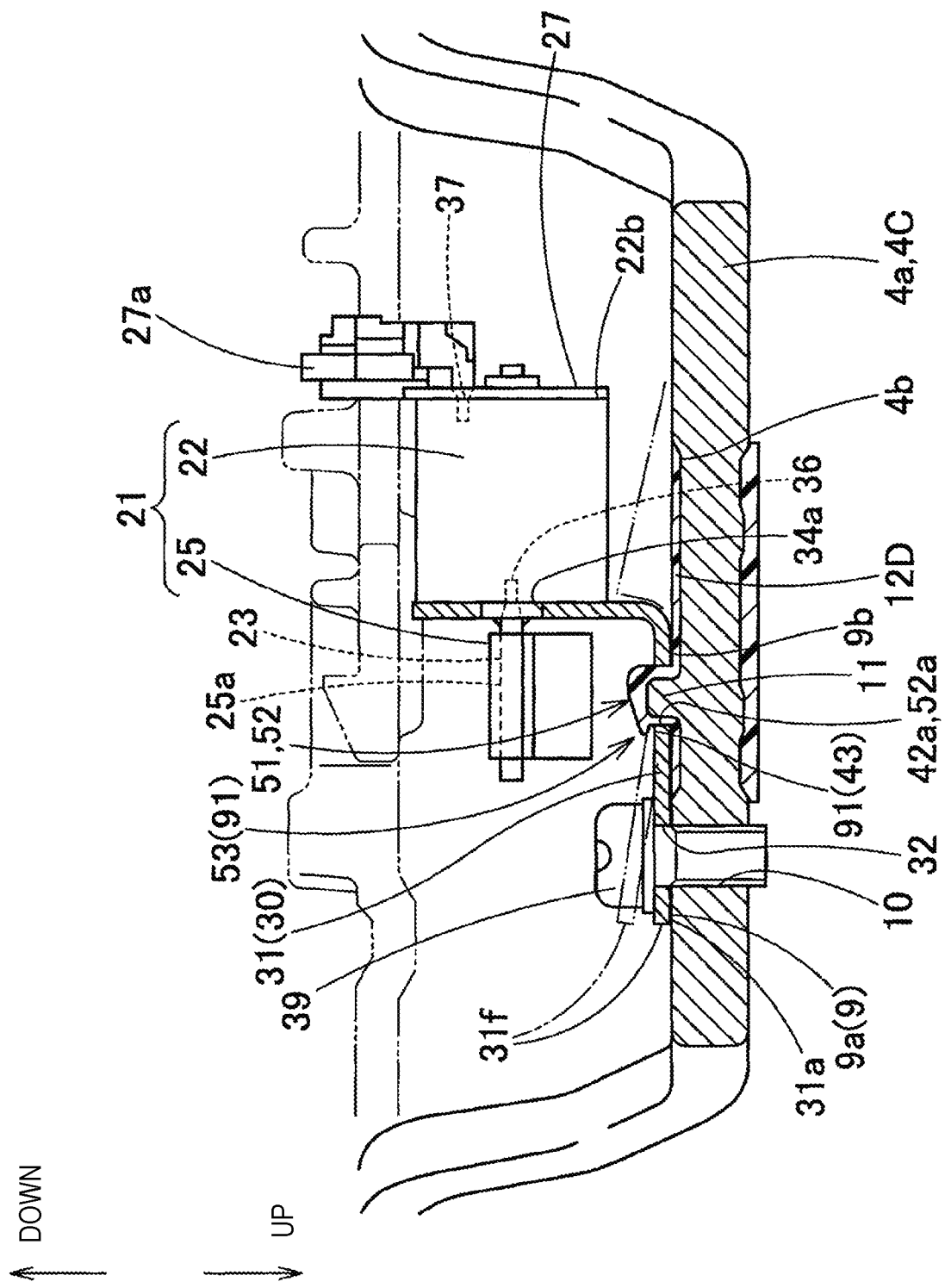
FIG. 15 is an enlarged sectional view schematically illustrating the portion taken along line XV-XV portion of FIG. 14 where the vibration device of the second embodiment is arranged.
Figure 16:
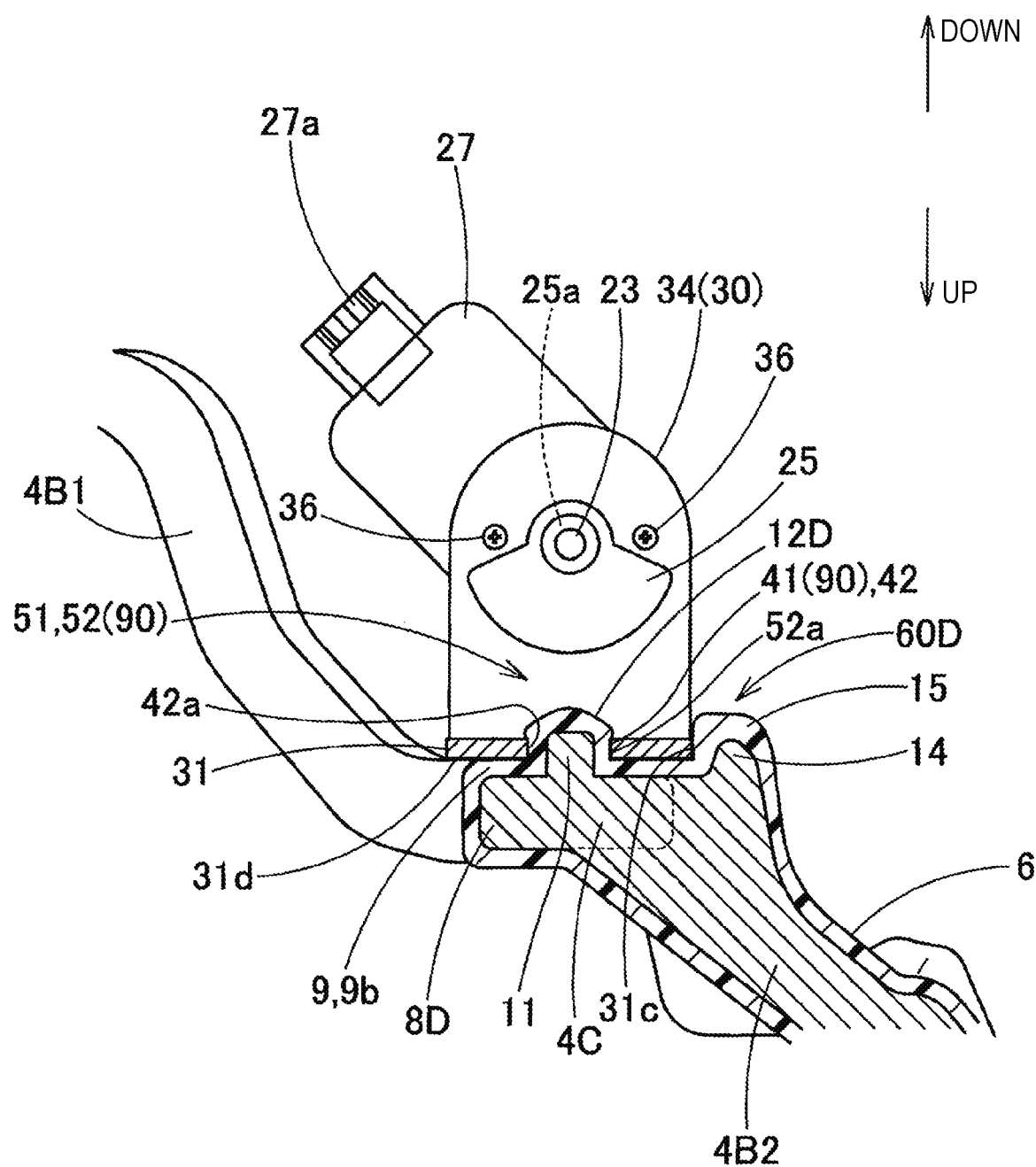
FIG. 16 is an enlarged sectional view schematically illustrating the portion taken along line XVI-XVI portion of FIG. 14 where the vibration device of the second embodiment is arranged.
Figure 17:
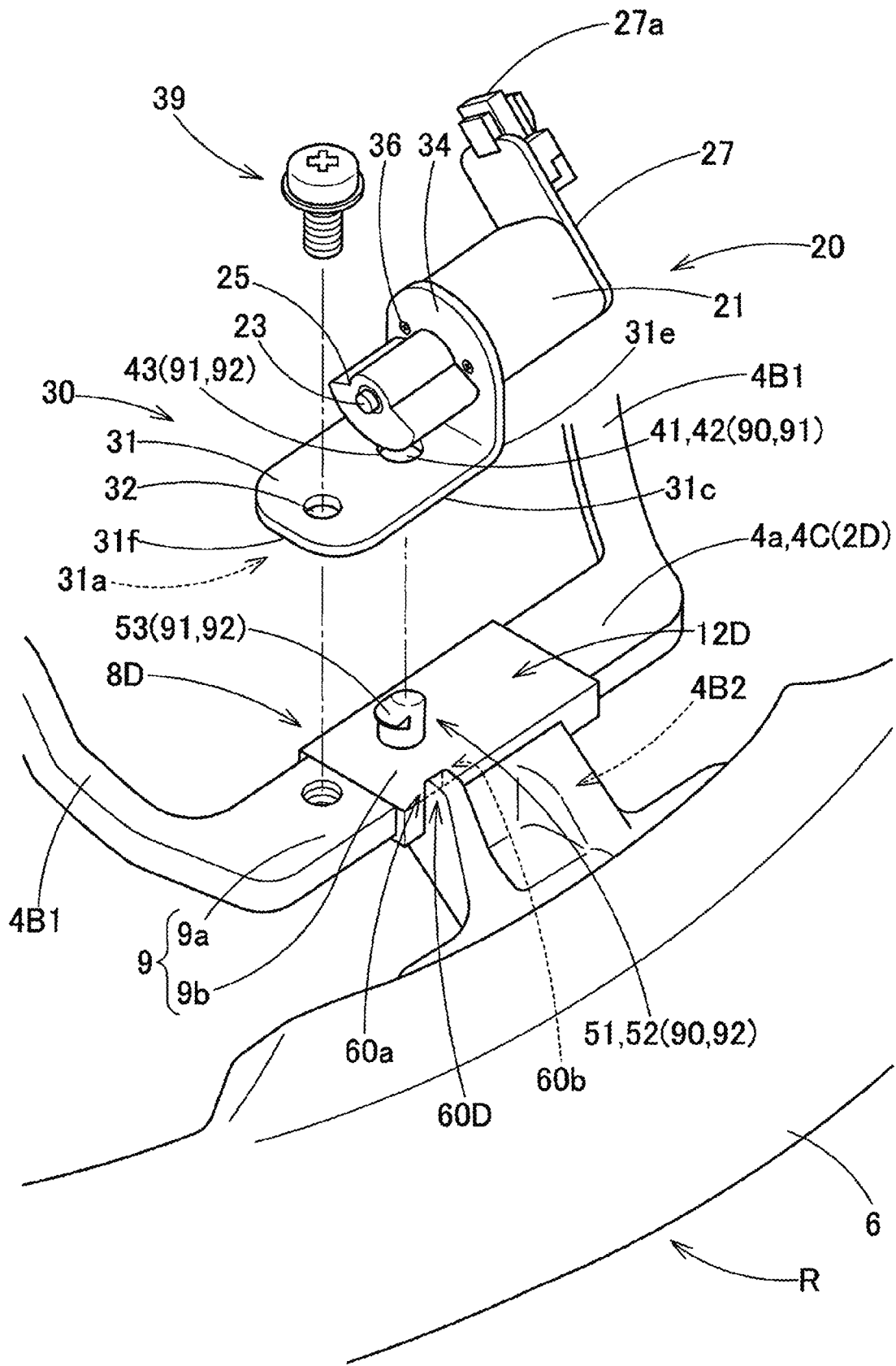
FIG. 17 is a partial perspective view schematically illustrating the vibration device and an attachment seat of a core metal in the second embodiment.

Similarly with the first embodiment, as illustrated in FIGS. 15 to 17, the vibration device 20 of the second embodiment includes the vibration motor 21 for rotating the rotary drive shaft 23 attached with the weight 25, the attachment bracket 30 which holds the vibration motor 21 and is attached to the attachment seat 8D, and the circuit board 27 which includes a circuit for supplying the driving power to the vibration motor 21. In addition, similarly with the first embodiment, the attachment bracket 30 of the second embodiment includes the holding piece 34 which holds the vibration motor 21 by using the screw 36 and the attachment piece 31 which has the insertion hole 32 for inserting the screwed screw 39 into the attachment hole 10 of the attachment seat 8D.

In the attachment seat 8D of the second embodiment, similarly with the first embodiment, the attachment hole 10 for fastening the screw 39 which is inserted through the insertion hole 32 of the attachment bracket 30 is formed on the right end side (in FIG. 14, the left end side), and the penetrating convex part 52 forming the attachment convex part 51 protrudes near the center in the lateral direction. A vicinity of the attachment hole 10 in the attachment seat 8D is formed as the flat part 9 which abuts on the abutting-side back surface 31a of the attachment piece 31. However, in order that the fastening force is enhanced by metal touch in the abutting state between the attachment piece 31 and the attachment seat 8 during the fastening of the screw 39, the vicinity of the attachment hole 10 is formed as the metal flat part 9a from which the spoke core material 4C is exposed, and the vicinity of the penetrating convex part 52 is formed as the coated flat part 9B provided with the coating layer 6 coating the core material 4C (see FIGS. 15 to 17).

Incidentally, in the second embodiment, the coating layer 6 of the coated flat part 9B is formed by the coating part 12D which extends from the portion coating the ring core material 5 to coat the spoke core material 4B2 and to coat the attachment seat 8D. Incidentally, the coating part 12D is arranged on the lower surface side (the lower surface side in the mounted state in the vehicle) of the attachment seat 8D to be filled in a concave part 4B provided in the connection rod part 4a.

Similarly with the first embodiment, the penetrating convex part 52 of the second embodiment is also configured such that the core-material protrusion part 11D extending from the core material 4C is coated with the coating part 12D extending from the coating layer 6. Further, similarly with the first embodiment, the protrusion part 53 which projects in a flange shape to the attachment hole 10 side near the tip of the core-material protrusion part 11D is formed in the coating part 12D.

Of course, also in the second embodiment, the inner diameter dimension of the through hole 42 of the attachment piece 31 and the outer diameter dimension of the penetrating convex part 52 of the attachment seat 80 are dimensions in the state of being fitted to each other. The assembly concave part 41 and the assembly convex part 51 are assembled to be fitted to each other when the attachment piece 31 is arranged in the attachment seat 80, and the rotation regulating unit 90 regulates the rotation of the attachment piece 31 during fastening of the screw 39. Further, also in the case of the second embodiment, in the protrusion part 53 of the penetrating convex part 52, the peripheral edge 43 of the through hole 42 can be locked after the penetrating convex part 52 is inserted to the through hole 42 while the attachment piece 31 is arranged from the upper side in the attachment seat 80 directed upward. That is, when the protrusion part 53 locks the peripheral edge 43 of the through hole 42, it is regulated that the attachment piece 31 floats from the attachment seat 8 due to the declining of the holding piece 34 holding the vibration motor 21 when the attachment piece 31 is arranged from the upper side to the attachment seat 8D (see the two-dot chain line of FIG. 15). For this reason, the protrusion part 53 of the penetrating convex part 52 and the peripheral edge 43 of the through hole form the floating regulating unit 91 which regulates the floating of the attachment piece 31 from the attachment seat 8D. Further, as described above, also in the second embodiment, the through hole 42 and the penetrating convex part 52 also form the rotation regulating unit 90 and form the dual-use regulating unit 92 compatible with the floating regulating unit 91.

In the second embodiment, the regulation part 60D which can regulate the rotation of the side surface 31c during the fastening of the screw 39 is arranged on the side surface 31c side of the attachment piece 31 in the width direction (in the illustrated example, the rear side) in the periphery of the attachment seat 8D. The regulation part 60D is arranged to be provided with the core-material protrusion part 14 projecting from the core material 4 (4B2) arranged in the periphery of the attachment seat 8D. Specifically, in the regulation part 60D, the core-material protrusion part 14 is configured to be covered with the coating part 15 extending from the coating part 12D.

For this reason, in the second embodiment, the regulation part 60D abuts on the side surface 31c of the attachment piece 31 of the attachment bracket 30 during the fastening of the screw 39, so as to regulate the rotation of the attachment piece 31. Thus, the rotation regulating unit 60D is configured by the regulation part 60D and the side surface 31c.

In the second embodiment, the regulation part 60D of the rotation regulating unit 60D is configured to be provided with the core-material protrusion part 14 made of the core material 4B2. Thus, the strength can be improved compared to the regulation part 60 configured only by the coating part 12 of FIG. 10, and the rotation of the attachment piece 31 during the fastening of the screw 39 can be regulated stably.

Incidentally, in the regulation part 60D of the second embodiment, a case is described in which the core-material protrusion part 14 is covered with the coating part 15 extending from the coating layer 6. However, the core-material protrusion part 14 may be formed only of the core material 4B2 without the coating part 15.

In the second embodiment, two kinds of the regulation part 60D and the penetrating convex part 52 are arranged as the rotation regulating unit, and the regulation part 60D is arranged to regulate the side surface 31c of the attachment piece 31 near the side of the through hole 42 penetrating the penetrating convex part 52. Specifically, the regulation part 60D is arranged on the side surface 31c side of the attachment piece 31 to wrap the through hole 42 with a wrap amount R (see FIG. 4) in a direction along a longitudinal direction (the direction connecting the attachment hole 32 and the through hole 42) of the attachment piece 31. For this reason, when the penetrating convex part 52 penetrates the through hole 42 of the attachment bracket 30 such that the insertion hole 32 matches with the attachment hole 10, and the attachment piece 31 is arranged in the attachment seat 8D, the position is regulated such that the side surface 31c of the attachment piece 31 is also guided to the regulation part 60D and is arranged in a predetermined position. For this reason, although the attachment piece 31 tries to rotate about the penetrating convex part 52 in a clockwise direction or a counterclockwise direction in a state where the penetrating convex part 52 penetrates the through hole 42, the side surface 31c of the attachment piece 31 is regulated near both edges 60A and 60B of the regulation part 60D in the lateral direction, so as to regulate the rotation. That is, the insertion hole 32 of the attachment piece 31 is arranged without being deviated from the upper side of the attachment hole 10. Thus, when the attachment piece 31 of the attachment bracket 30 is arranged in the attachment seat 8D, the regulation part 60D and the penetrating convex part 52 prevent that the insertion hole 32 is deviated from the attachment hole 10. Thereafter, the screw 39 can be easily inserted into the attachment hole 10 through the insertion hole 32, and further the attachment bracket 30 is easily attached to the attachment seat 8D.

In the steering wheel W of the first embodiment, the attachment seat 8 for attaching the vibration device 20 is provided in the portion of the core material 5 of the ring part R. In the case of the first embodiment, the vibration motor 21 can be arranged in the ring part R itself which the driver grips, and the driver easily senses the vibration of the vibration device 20 during operation. However, as in the steering wheel W of the first embodiment, in a case where the attachment seat 8 is provided in the portion of the core material 5 of the ring part R, the vibration device 20 has a bulky shape. Thus, the arrangement space is required, the thickness dimension of the vicinity of the ring part R, particularly, the thickness dimension T from a ring surface RP is increased (see FIG. 4), and the appearance of the vicinity of the ring part is easily deteriorated. When the attachment seat 8 is provided in the portion of the core material 5 of the ring part R in consideration of this point, the attachment seat 8 is arranged while a concave part is provided in the core material 5. However, in order to prevent that the strength of the core material 5 of the ring part R is reduced, it is necessary to provide the concave part for attachment seats, which requires much labor.

On the other hand, in a case where the attachment seat is provided in the portion of the core material of the spoke part, the attachment seat can be arranged easily while the arrangement space is not taken into consideration, and the configuration in which the concave part causing the strength reduction is provided in the core material is not adopted.

However, as in the steering wheel WD of the second embodiment, in a case where the attachment seat 8D is provided in the portion of the core material 4 (4C) of the spoke part S (SB), the attachment seat 8D can be arranged easily while the arrangement space is not taken into consideration, and the configuration in which the concave part causing the strength reduction is provided in the core material 4 is not adopted.

Incidentally, in the second embodiment, when the attachment seat 8D is arranged in the spoke part S, the vibration device 20 is attached to the spoke part SB on the rear side. However, the attachment seats may be provided in right and left spoke parts SFL and SFR, and the vibration device may be arranged.

What is claimed is:

1. A steering wheel comprising:
a ring part configured to be gripped during steering;
a boss part arranged in a center of the ring part;
a spoke part connecting the ring part and the boss part; and
a core material arranged to connect the ring part, the boss part, and the spoke part, wherein:
a vibration device is configured to be attached to an attachment seat provided in the core material, to generate a vibration in the ring part;
the vibration device includes a vibration motor on which a weight is provided on a rotary drive shaft of a motor body and an attachment bracket which holds the vibration motor and is clamped by a screw on the attachment seat of the core material;
the attachment bracket includes:
an attachment piece which is fixed in the attachment seat by the screw, has an insertion hole for inserting the screw, and is attached to the attachment seat by the screw which passes through the insertion hole to be fastened to an attachment hole of the core material; and
a holding piece which extends to be bent from an end part of the attachment piece apart from the insertion hole and holds the vibration motor;
the attachment seat and the attachment bracket correspond to each other to arrange a rotation regulating unit and a floating regulating unit,
the rotation regulating unit is configured to regulate a rotation of the attachment piece during screw-clamping in the attachment seat,
the floating regulating unit is configured to regulate floating of the attachment piece from the attachment seat due to declining of the holding piece holding the vibration motor when the attachment piece is arranged upright in the attachment seat,
the core material made by metal is exposed so that a peripheral edge of the attachment hole of the attachment seat abuts on the metal attachment piece of the attachment bracket; and portions of the rotation regulating unit and the floating regulating unit on the attachment seat side are configured by arranging an elastic coating layer which coats the core material.

2. The steering wheel according to claim 1, wherein the rotation regulating unit includes an assembly concave part and an assembly convex part which are assembled to be fitted to each other when the attachment piece is arranged in the attachment seat and are arranged in correspondence with the attachment seat and the attachment piece.

3. The steering wheel according to claim 2, wherein the assembly concave part and the assembly convex part of the rotation regulating unit are compatible with the floating regulating unit to regulate that the attachment piece floats from the attachment seat.

4. The steering wheel according to claim 3 wherein:
the assembly concave part is provided in the attachment piece; and
the assembly convex part is provided in the attachment seat to penetrate the assembly concave part provided in the attachment piece, and the assembly convex part includes a protrusion part which locks a peripheral edge of the penetrated assembly concave part and regulates that the attachment piece floats from the attachment seat.

5. The steering wheel according to claim 3 wherein:
the assembly convex part is provided in the attachment piece; and
the assembly concave part is provided in the attachment seat to insert the assembly convex part provided in the attachment piece, and the assembly concave part includes an abutting part which abuts on the assembly convex part when the attachment piece in the inserted assembly convex part is tilted in a floating direction and regulates that the attachment piece floats from the attachment seat.

6. The steering wheel according to claim 1, wherein the rotation regulating unit is configured to arrange a regulation part, which regulates a side surface of the attachment piece during screw-clamping, on the attachment seat side.

7. The steering wheel according to claim 6, wherein the regulation part is arranged to be provided with a core-material protrusion part which projects from the core material arranged in a periphery of the attachment seat.

8. The steering wheel according to claim 6, wherein the regulation part includes a lock part which regulates a surface opposite to the attachment seat in the attachment piece and is arranged to form the floating regulating unit.

9. The steering wheel according to claim 1, wherein the floating regulating unit extends beyond the holding piece in a direction away from the insertion hole of the attachment piece and is configured to be arranged with a regulating piece which abuts on a vicinity of the attachment seat when the attachment piece is tilted in the floating direction.

10. The steering wheel according to claim 1, wherein the attachment seat is provided in a portion of the ring part in the core material.

11. The steering wheel according to claim 1, wherein the attachment seat is provided in a portion of the spoke part in the core material.

12. A steering wheel comprising:
a ring part configured to be gripped during steering;
a boss part arranged in a center of the ring part;
a spoke part connecting the ring part and the boss part; and
a core material arranged to connect the ring part, the boss part, and the spoke part, wherein:

a vibration device is configured to be attached to an attachment seat provided in the core material, to generate a vibration in the ring part;

the vibration device includes a vibration motor on which a weight is provided on a rotary drive shaft of a motor body and an attachment bracket which holds the vibration motor and is clamped by a screw on the attachment seat of the core material;

the attachment bracket includes:

an attachment piece which is fixed in the attachment seat by the screw, has an insertion hole for inserting the screw, and is attached to the attachment seat by the screw which passes through the insertion hole to be fastened to an attachment hole of the core material; and a holding piece which extends to be bent from an end part of the attachment piece apart from the insertion hole and holds the vibration motor;

the attachment seat and the attachment bracket correspond to each other to arrange a rotation regulating unit and a floating regulating unit, the rotation regulating unit is configured to regulate a rotation of the attachment piece during screw-clamping in the attachment seat, the floating regulating unit is configured to regulate floating of the attachment piece from the attachment seat due to declining of the holding piece holding the vibration motor when the attachment piece is arranged upright in the attachment seat, and the floating regulating unit includes an assembly concave part and an assembly convex part, the assembly convex part is configured to penetrate into the assembly concave part, a protrusion part extending from the assembly convex part to lock a peripheral edge of the penetrated assembly concave part.

* * * * *